(12) United States Patent
Senturia et al.

(10) Patent No.: US 7,196,789 B2
(45) Date of Patent: Mar. 27, 2007

(54) LIGHT PROCESSOR PROVIDING WAVELENGTH CONTROL AND METHOD FOR SAME

(75) Inventors: Stephen D. Senturia, Brookline, MA (US); Malcolm C. Smith, Winchester, MA (US)

(73) Assignee: Polychromix Corporation, Wilmington, MA (US)

( * ) Notice: Subject to any disclaimer, the term of this patent is extended or adjusted under 35 U.S.C. 154(b) by 453 days.

(21) Appl. No.: 10/752,212

(22) Filed: Jan. 6, 2004

(65) Prior Publication Data

US 2005/0083523 A1   Apr. 21, 2005

Related U.S. Application Data

(60) Provisional application No. 60/512,171, filed on Oct. 15, 2003.

(51) Int. Cl.
*G01J 3/42* (2006.01)
*G01J 3/433* (2006.01)

(52) U.S. Cl. ...................... 356/323; 356/324

(58) Field of Classification Search ........ 356/323–325, 356/333
See application file for complete search history.

(56) References Cited

U.S. PATENT DOCUMENTS

| | | | | |
|---|---|---|---|---|
| 3,716,300 A | * | 2/1973 | Matsumoto et al. | ......... 356/323 |
| 3,927,944 A | * | 12/1975 | Iwashashi et al. | .......... 356/325 |
| 3,945,729 A | * | 3/1976 | Rosen | ......................... 356/425 |
| 4,193,691 A | | 3/1980 | Fjarlie | |
| 4,262,205 A | * | 4/1981 | Abu-Shumays | ............. 356/318 |
| 5,054,912 A | * | 10/1991 | Kuchel | ....................... 356/487 |
| 5,090,807 A | | 2/1992 | Tai | |
| 5,098,187 A | * | 3/1992 | Judge | ......................... 356/325 |
| 5,260,574 A | * | 11/1993 | Becker | ....................... 356/323 |
| 5,504,575 A | | 4/1996 | Safford | |
| 5,579,105 A | | 11/1996 | Belton et al. | |
| 5,747,806 A | | 5/1998 | Khalil et al. | |
| 5,748,308 A | | 5/1998 | Lindberg et al. | |
| 5,757,536 A | | 5/1998 | Ricco et al. | |
| 5,815,270 A | * | 9/1998 | Lee | ............................. 356/367 |
| 5,905,571 A | | 5/1999 | Butler et al. | |
| 6,038,067 A | | 3/2000 | George | |
| 6,128,077 A | * | 10/2000 | Jovin et al. | ................ 356/330 |
| 6,128,078 A | | 10/2000 | Fateley | |
| 6,504,943 B1 | | 1/2003 | Sweatt et al. | |
| 6,631,199 B1 | * | 10/2003 | Topping et al. | ............... 356/71 |

FOREIGN PATENT DOCUMENTS

GB   2328015 A   2/1999

OTHER PUBLICATIONS

Houser, et al., "Balanced Detection Technique to Measure Small Changes in Transmission", Applied Optics, Optical Society of America, Washington, US, vol. 33, No. 6, Feb. 20, 1994, pp. 1059-1062, XP000434815, ISSN: 0003-6935.

* cited by examiner

*Primary Examiner*—Gregory J. Toatley
*Assistant Examiner*—Kara Geisel
(74) *Attorney, Agent, or Firm*—Lowrie, Lando & Anastasi, LLP.

(57) ABSTRACT

A light processor (such as a spectrometer) providing wavelength equalization for a sample pathway and a reference pathway by actuation of a light amplitude modulator. A chemometric processor including a light amplitude modulator capable of performing chemical analysis by applying weights to wavelengths of light, thereby reducing the need for electronic post processing.

150 Claims, 8 Drawing Sheets

LIGHT PROCESSOR PROVIDING WAVELENGTH CONTROL AND METHOD FOR SAME

RELATED APPLICATIONS

This application claims priority under 35 U.S.C. § 119(e) to U.S. Provisional Application Ser. No. 60/512,171, entitled "SPECTROMETER PROVIDING WAVELENGTH CONTROL AND METHOD FOR SAME," to Senturia, et al., filed on Oct. 15, 2003, which is herein incorporated by reference in its entirety.

BACKGROUND OF INVENTION

1. Field of Invention

The present invention is directed to light processing methods and apparatus, and in particular to light processing methods and apparatus providing wavelength control.

2. Background

Many types of light processors for use in analyzing matter are known. Examples of such light processors include spectrometers. Spectroscopy is the study of the spectral characteristics of matter, and the use of such spectral characteristics to obtain qualitative and/or quantitative information about samples of matter (also referred to herein simply as samples). Conventional spectroscopic techniques utilize absorption spectra of matter or emission spectra of matter, as determined by the energy level structures of constituent atoms and molecules, to determine the presence and/or quantity of such atoms and molecules in the matter.

Instruments used to measure absorption spectra are commonly referred to as absorption spectrometers. In absorption spectrometers, information is obtained about the composition of a sample by projecting light onto or through a sample and observing the amount of the light that is absorbed by the sample as a function of wavelength. Because atoms and molecules have unique absorption spectra (also commonly referred to as spectral signatures), it is possible to determine the presence and/or quantity of constituents of the sample of matter. Typically, spectra measured by a spectrometer are divided into two or more wavelength components for analysis. As one of ordinary skill in the art would understand, use of the term "wavelength" herein, such as when referring to a wavelength of light that is detected or a wavelength of light from a source, refers to light of the indicated wavelength and light from a finite band of wavelengths around said wavelength, as may be determined by the laws of physics and/or conventional design practices. Also, the term "light" as used herein is used to refer to radiation of any suitable wavelength, not just visible light.

There exist numerous types of conventional absorption spectrometers. Conventional absorption spectrometers typically have the following features in common: a light source that covers a desired band of wavelengths from which spectral signatures are to be determined; a detector (comprising a single detector element or an array of detector elements) that is sensitive to light in the desired wavelength range; and optical componentry (e.g., a focusing element) that collects the light after it interacts with the sample of matter and directs the collected light onto the detector. Additionally, because information is present in the absorbed light as a function of incident wavelength, an apparatus providing wavelength selection is typically present to enable information as a function of wavelength to be detected. The path from a light source, to a sample of matter, and possibly further (e.g., onto the detector) is commonly referred to as a "sample pathway."

Conventional absorption spectrometers may employ any of several different wavelength selection and detection techniques, for example: (a) using a monochromator to project wavelengths of light sequentially onto a sample, followed by collecting the wavelengths with a detector, so as to obtain wavelength absorption information as a function of time; (b) projecting multiple wavelengths of light from a broadband light source onto a sample simultaneously, dispersing the wavelengths comprising the light after it interacts with the sample (e.g., using a diffraction grating), and then projecting the light onto a detector array, such that each detector element in the array receives light of a selected wavelength; or (c) projecting light from a broadband source though each of a series of fixed optical filters in a sequential manner (e.g., by locating the filters on a motor-driven chopper wheel), so as to bring a sequence of wavelengths of light onto a sample sequentially, and capturing the light after interaction with the sample so as to obtain wavelength information as a function of time. Spectrometers of type (a) are referred to herein as monochromator-type spectrometers, those of type (b) are referred to herein as optical multichannel analyzers (OMA), and those of type (c) are referred to herein as non-dispersive (ND) spectrometers.

Prior to measuring a sample of matter, any of the above types of spectrometers is typically calibrated to account for detector and/or light source characteristics that may affect a measured output from a detector. For example, calibration may account for a detector having different sensitivities to different wavelengths of light, the individual detectors of an array of detectors having different sensitivities to the same wavelength of light, a source producing more light in a given portion of a spectrum than in another portion of the spectrum, and/or the light source output varying over time.

An example of a calibration technique is "empty cell" calibration, in which, prior to measurement, the sample pathway is traversed by light from a spectrometer's light source without a sample present. Such a reference measurement provides a baseline measurement for each wavelength to be measured. In such spectrometers, the baseline spectrum is stored, for example, in a processor, and during subsequent measurements, in which a sample is present, the baseline spectrum is compared with a spectrum measured with a sample present (i.e., a sample measurement) in an attempt to reduce the effects of the source and detector on a measured sample spectrum. A drawback of this technique is that the time period between the baseline measurement and a sample measurement can be relatively large and variations that occur during this time period (e.g., variations in source output) can be large.

More complex spectrometers have both a sample pathway and a "reference pathway," and are referred as dual beam spectrometers. The reference pathway is designed to be the same as the sample pathway, except that the reference pathway has no sample present. In such spectrometers, a switching mirror may be operated to alternate between measuring light from the sample pathway and measuring light from the reference pathway such that the source and detector characteristics may be occasionally measured, to reduce the time period between reference measurements and sample measurements. A processor is then used to reduce the effects of variations in characteristics of the detector and/or the source by comparing measurements of light from the sample pathway with the baseline measurements in a manner similar to systems employing only a sample pathway, as described above. A limitation of this calibration technique is that, unless the reference pathway and sample pathway are identical (except for the presence of a sample), there can be a residual wavelength-dependent error present in measured spectra.

Some conventional spectrometers measure light from a sample by continuously receiving light from a sample to be measured (i.e., they "stare" at the sample), except for an occasional empty cell (baseline) measurement. A drawback of such spectrometers can be that they provide a low dynamic range for measuring changes resulting from absorption by constituent atoms and molecules. The low dynamic range arises because the amount of light absorbed by the constituents may be a small percentage of the light incident on a detector. Accordingly, all of the information about spectral signatures is contained in a small variation in a relatively large background signal.

Additional drawbacks of such spectrometers include that they are susceptible to errors arising from drift of both the detector and the optical source, 1/f noise and shot noise. Both sources of drift cause the outputs measured by the detector to vary over time. 1/f noise and shot noise are well known sources of noise. 1/f noise arises in systems which are designed to measure low frequency signals, and shot noise arises from the randomness of the arrival of photons at a detector and increases with the number of photon measured (i.e., intensity of the light measured) To overcome these problems, dual beam spectrometers are commonly operated as so-called AC spectrometers. For example, in an AC spectrometer a switching mirror alternately projects light from a reference pathway and a sample pathway onto a detector in a periodic manner, so as to produce an AC component in the detector output signal. By AC coupling an output of the detector for subsequent processing, the background signal that is common to the reference signal and sample signal may be removed such that the amplitude of the AC signal is proportional to the light absorbed by a sample in the sample pathway. Additionally, by alternating between detecting the sample pathway and the reference pathway it is possible to reduce the effects of detector drift and 1/f noise. However, while AC filtering improves the quality of the signal (e.g., by improving dynamic range), such systems do not compensate for any residual wavelength errors that may exist between a sample pathway and a reference pathway, as was described above. Furthermore AC-filtering does not remove the effects of shot noise because the intensity of the light measured is not reduced.

After absorption is measured using any of the above spectrometers, a determination of the amount of one or more constituents may be calculated. Determination of the amount of one or more selected constituents present in a sample is referred to as chemometrics. Conventionally, analysis to determine the amount of the constituents is performed using post processing of an output measured by a detector. The post processing typically includes correlating the absorption by the sample (measured as a function of wavelength) to a library of chemicals having known spectral signatures, for example, using a computer. A drawback of such conventional spectrometers is that the post processing to determine presence and/or amount of constituents in a sample can be computationally intensive and time consuming.

SUMMARY

Aspects of the present invention are directed to a dynamic differential compensation technique employing a light amplitude modulator in a signal pathway of a dual-beam spectrometer. As defined herein a "light amplitude modulator" is a modulator capable of effecting a change in an amount of light per unit area. Also, as defined herein the phrase "optically coupled to" means adapted to receive light directly or indirectly (from an indicated device) in an operative manner; and/or to transmit light directly or indirectly (to an indicated device) in an operative manner.

According to some embodiments of the invention, a light processor comprises one or more light amplitude modulators to compensate for wavelength-dependent variations between the sample pathway and the reference pathway. For example, by adjusting the throughput of the light amplitude modulator during a calibration step in which an empty cell is present in the sample pathway, an amount of light from the reference pathway and an amount of light from the sample pathway may be adjusted to be equal to one another (e.g., in an AC-spectrometer, the detector signal is adjusted to have only a DC component, to within the noise limit of the detector), for one or more measured component wavelengths. By adjusting the light amplitude modulator to so remove the effects of the differences between the sample pathway and the reference pathway, the signal-to-noise ratio of the output signal from the detector may be improved.

Other aspects of the present invention are directed to shot noise reduction by suppression of light of selected component wavelengths through the use of a light amplitude modulator in a sample pathway and/or a reference pathway of a spectrometer. According to this aspect, it is possible to eliminate or reduce light at selected wavelengths during a measurement for which the component wavelengths are unused or undesirable. For example, some wavelengths may not be used during a measurement of a particular spectral signature. Accordingly, the total light incident detected may be reduced and the shot noise present may be reduced for the wavelengths to be measured.

Further aspects of the invention are directed to a chemometric measurement technique that reduces the amount of post processing that is performed electronically to obtain a chemometric measurement of a sample. In some embodiments, the measurements are performed in real time using a light amplitude modulator in a sample pathway to apply weightings to one or more wavelength components of light that have interacted with a sample to be measured. For example, a spatial light amplitude modulator may apply weightings to the wavelength components such that by recombining the weighted components, an output may be obtained that is proportional to or equal to the amount of a constituent in the sample. Spectrometers according to this aspect of the invention may be dual beam or may have only sample pathway. As used herein, an item referred to as a "device" may comprise one or more items referred to as an "element." Such elements may, for example, be mechanically separated or mechanically connected.

A first aspect of the invention is directed to a light processor, comprising: a light source adapted to produce light having at least one wavelength; a splitter adapted to form a reference pathway and a sample pathway with the light, the sample pathway adapted to receive a sample; a first light amplitude modulator optically coupled to the splitter and disposed in one of the reference pathway and the sample pathway; and a detector unit optically coupled to the first light amplitude modulator, and adapted to receive light from the sample pathway and light from the reference pathway. In some embodiments, the light source comprises a broadband source and may comprise a plurality of narrowband sources, each adapted to produce light at a different wavelength.

The light processor may comprise a wavelength selective device operatively disposed intermediate the light source and the first light amplitude modulator, and adapted to divide light in the reference pathway and light in the sample pathway into a plurality of component wavelengths. In some such embodiments, the light source may be adapted to produce light comprising a plurality of wavelengths, and wherein the first light amplitude modulator is configured and arranged to separately amplitude modulate at least light at a first of the plurality of wavelengths and light at a second of the plurality of wavelengths. The wavelength selective device may comprise a first wavelength selective element configured and arranged to divide light in the sample pathway into component wavelengths and a second wavelength selective element configured and arranged to divide light in the reference pathway into component wavelengths. Optionally, the wavelength selective device may comprise a first wavelength selective element configured and arranged to divide both light in the sample pathway and light in the reference pathway. The wavelength selective device may comprise a dispersive element.

The light processor may comprise a second light amplitude modulator optically coupled to the splitter and disposed in the other of the reference pathway and sample pathway. The first light amplitude modulator and the second light amplitude modulator may be configured and arranged to direct light onto the detector unit. In some embodiments, a collocation device is operatively disposed intermediate the first light amplitude modulator and the detector unit, and operatively disposed intermediate the second light amplitude modulator and the detector unit, the collocation device being configured and arranged to direct both light in the reference path and the sample path onto the detector unit. The collocation device may comprise a prism.

In some embodiments, at least one of the first light amplitude modulator and the second light amplitude modulator is a grating modulator. Optionally, the at least one of the first light amplitude modulator and the second light amplitude modulator is a MEMS-based diffraction grating modulator. In some embodiments, at least one of the first light amplitude modulator and the second light amplitude modulator is a liquid crystal modulator.

In some embodiments, the light processor comprises a second light amplitude modulator optically coupled to the splitter and disposed in the other of the reference pathway and sample pathway, and wherein at least one of the first light amplitude modulator and the second light amplitude modulator comprises a plurality of addressable regions, each of the plurality of addressable regions being configured and arranged to modulate a corresponding one of the plurality of component wavelengths. The first light amplitude modulator and the second light amplitude modulator may be disposed on a common chip.

In some embodiments, a focusing device is operatively disposed intermediate the splitter and at least one of the first light amplitude modulator and the second light amplitude modulator, and arranged to focus light onto the at least one of the first light amplitude modulator and the second light amplitude modulator. The focusing device may comprise a first focusing element operatively disposed intermediate the splitter and the first light amplitude modulator and adapted to focus light in the sample pathway onto the first light amplitude modulator, and a second focusing element operatively disposed intermediate the splitter and the second light amplitude modulator and adapted to focus light in the reference pathway onto the second light amplitude modulator. The light processor may comprise a processor, wherein the processor is adapted to actuate the first light amplitude modulator and the second light amplitude modulator to alternately transmit light, such that light in the reference pathway and light in the sample pathway are alternately projected onto the detector unit.

In some embodiments, the detector unit comprises a first detector arranged to receive light from the sample pathway and a second detector adapted to receive light from the reference pathway. The light source may be adapted to produce light having a plurality of wavelengths, and wherein light in each of the reference pathway and the sample pathway comprises a plurality of wavelengths, and wherein at least one of the first detector and the second detector is comprised of an array detector comprising a plurality of array element, each array element being arranged to detect a corresponding at least one of the plurality of wavelengths from both the reference pathway and the sample pathway. Optionally, at least one of the first detector and the second detector may consist of a single detector element. The detector unit may be adapted to combine an output of the first detector and an output of the second detector in an alternating manner to form a signal having an AC component.

In some embodiments, the detector unit comprises a detector arranged to receive light from both the reference pathway and the sample pathway. Optionally, a collocation device may be operatively disposed intermediate the first light amplitude modulator and the detector unit and operatively disposed intermediate the second light amplitude modulator and the detector unit, the collocation device being configured and arranged to direct both light in the reference pathway and light in the sample pathway onto the detector. The detector may comprise an array detector or may consist of a single detector element.

In some embodiments, the light source produces light comprising a plurality of wavelengths, and the detector element is arranged to receive the plurality of wavelengths from both of the sample pathway and the reference pathway. The light source may be adapted to sequentially project light comprising a first wavelength and light comprising a second wavelength, the first wavelength being different than the second wavelength. In some embodiments, the light source comprises a tunable source.

The light processor may comprise a processor adapted to actuate at least the first light amplitude modulator to selectively transmit the component wavelengths such that one of an ND-type or spectrometer-type output is obtained from the detector unit. The splitter may comprise a conventional beam splitter or may comprise a fiber optic configured and arranged to tap a portion of one of the sample pathway and the reference pathway to form the other of the sample pathway and the reference pathway.

The light processor may comprise an optical switching device configured and arranged to alternately project light in the reference pathway and light in the sample pathway onto the detector unit. The optical switching device may be a switching mirror.

The light processor may comprise a processor operatively coupled to the detector unit and adapted to determine a first amount of light comprising the sample pathway and a second amount of light comprising the reference pathway. In some embodiments, the first amount of light and the second amount of light both consist of a same single wavelength.

The processor may be operatively coupled to the first light amplitude modulator, and adapted to actuate the first modulator in response to at least one of the first amount of light and the second amount of light. The processor may be adapted to actuate the first light modulator to equalize the first amount of light with the second amount of light.

The light processor may comprise an integrator device having an input to receive light from the first light amplitude modulator and an output optically coupled to the detector unit. Optionally, the light processor may comprise an integrator device operatively disposed intermediate the wavelength selective device and the detector unit, wherein the integrator device is comprised of a second dispersive element configured and arranged to recombine the component wavelengths of at least one of the reference pathway and the sample pathway.

Another aspect of the invention is directed to a spectrometer, comprising: a light source adapted to produce light having a plurality of wavelengths; a splitter adapted to form a reference pathway and a sample pathway with light from the light source, the sample pathway adapted to receive a sample; a wavelength selective device coupled to the light source and adapted such that light in the reference pathway and light in the sample pathway is divided into a plurality of component wavelengths; a first light amplitude modulator disposed in the reference pathway and optically coupled to the wavelength selective device, and configured and arranged to separately modulate light at a first wavelength of the plurality of component wavelengths and light at a second wavelength of the plurality of component wavelengths; a second light amplitude modulator disposed in the sample pathway and optically coupled to the wavelength selective device, and configured and arranged to separately modulate light at the first wavelength of the plurality of component wavelengths and light at the second wavelength of the plurality of component wavelengths; and an integrator device optically coupled to receive the component wavelengths from the first light amplitude modulator and the second light amplitude modulator. In some embodiments, the splitter is disposed intermediate the light source and the wavelength selective device. The light source may comprise a broadband source, and the light source may comprise a plurality of narrowband sources.

In some embodiments, the wavelength selective device comprises a dispersive device configured and arranged to divide light in at least one of the reference pathway and the sample pathway into component wavelengths. The wavelength selective device may comprise a first dispersive element configured and arranged to separate both light in the reference pathway into component wavelengths and light in the sample pathway into component wavelengths. The dispersive element comprises a diffraction grating.

In some embodiments, the integrator device is configured and arranged to recombine a plurality of component wavelengths of at least one of the reference pathway and the sample pathway. In some embodiments, the integrator device is comprised of a dispersive element configured and arranged to recombine the component wavelengths light of the at least one of the reference pathway and the sample pathway. Optionally, the integrator device may be comprised of a first integrator element configured and arranged to recombine component wavelengths of light in the reference pathway and a second integrator element configured and arranged to recombine component wavelengths of light in the sample pathway. In some embodiments, at least one of the first integrator element and the second integrator element comprises a diffraction grating. The integrator device may be comprised of an integrating sphere. In some embodiments, the integrator device is comprised of a first integrating sphere configured and arranged to recombine component wavelengths of light in the reference pathway and a second integrating sphere configured and arranged to recombine component wavelengths of light in the sample pathway.

In some embodiments, at least the second light amplitude modulator comprises a plurality of addressable regions, each of the plurality of addressable regions being configured and arranged to modulate a corresponding at least one of the plurality of component wavelengths. In such embodiments, the at least one of the first light amplitude modulator and the second light amplitude modulator is a diffraction grating modulator. The at least one of the first light amplitude modulator and the second light amplitude modulator may be a MEMS-based diffraction grating modulator. In some embodiments, the at least one of the first light amplitude modulator and the second light amplitude modulator is a liquid crystal modulator. The first light amplitude modulator and the second light amplitude modulator may be disposed on a common chip.

The spectrometer may further comprise a detector unit optically coupled to an output of the integrator and comprising at least one detector. The first light amplitude modulator and the second light amplitude modulator may be adapted to alternately transmit light, such that light in the reference pathway and light in the sample pathway are alternately transmitted to the detector unit.

In some embodiments, the detector unit comprises a first detector arranged to receive light from the sample pathway and a second detector adapted to receive light from the reference pathway. Optionally, at least one of the first detector and the second detector is comprised of an array of detector elements. In some embodiments, at least one of the first detector and the second detector consists of single detector element. The detector unit may be adapted to combine an output of the first detector and an output of the second detector in an alternate manner to form a signal having an AC component. The detector unit comprises a detector arranged to receive light from both the reference pathway and the sample pathway. The detector may comprise an array of detector elements, each detector element adapted to detect a corresponding at least one wavelength of the wavelengths comprising each of the reference pathway and the sample pathway, and may be capable of summing outputs of the detector elements.

In some embodiments, the detector consists of single detector element. In such embodiments, the detector element is arranged to receive the component wavelengths from both the sample pathway and the reference pathway. A collocation device may be operatively disposed intermediate the integrator device and the detector unit, the collocation device being configured and arranged to direct both light in the reference path and the sample path onto the detector.

The spectrometer may comprise a processor adapted to actuate each of the plurality of addressable regions of at least the second light amplitude modulator to apply a corresponding weight to each of the plurality of component wavelengths, the weights corresponding to a transfer function of a chemical constituent, whereby the output of the integrator corresponds to a concentration of the chemical constituent. In some embodiments, the processor is adapted to actuate each of the plurality of addressable regions of the second light amplitude modulator to sequentially apply weights corresponding to a transfer function of a first chemical constituent and weights corresponding to a transfer function of a second chemical constituent, whereby the output of the integrator sequentially corresponds to a concentration of the first chemical constituent and the second chemical constituent. In some embodiments, at least one of weights is substantially equal to zero, whereby the addressable region applying the at least one weight has a throughput of substantially zero.

The processor may be adapted to actuate at least the second amplitude light modulator so as to sequentially transmit light consisting of a first set of wavelengths and light consisting of a second set of wavelengths, at least one wavelength of the second set of wavelengths being different than the wavelengths comprising the second set of wavelengths.

The processor may be operatively coupled to the detector unit and adapted to determine a first amount of light comprising the sample pathway and a second amount of light comprising the reference pathway. In some embodiments, the first amount of light and the second amount of light consist of a same, single wavelength. The processor may be operatively coupled to at least one of the first light amplitude modulator and the second light amplitude modulator, and is adapted to actuate the at least one of the first modulator and second modulator in response to at least one of the first amount of light and the second amount of light. The processor may be adapted to actuate the at least one of the first modulator and the second modulator to equalize the first amount of light with the second amount of light.

In some embodiments, the wavelength selective device comprises at least a first dispersive element configured and arranged to separate light in the reference pathway and light in the sample pathway into component wavelengths, and wherein at least one of the first light amplitude modulator and the second light modulator is adapted to retro-reflect light in a corresponding pathway back onto the dispersive element, whereby the integrator comprises a portion of the dispersive element.

Another aspect of the present invention is directed to a spectrometer, comprising: a light source adapted to produce light having a plurality of wavelengths in a sample pathway; a wavelength selective device coupled to the light source and adapted to divide light in the sample pathway into a plurality of component wavelengths; a first light amplitude modulator disposed in the sample pathway and optically coupled to the wavelength selective device, the first light amplitude modulator comprising a plurality of addressable regions, each of the plurality of addressable regions being configured and arranged to modulate a corresponding at least one of the plurality of component wavelengths; a processor adapted to actuate each of the plurality of addressable regions to apply a corresponding weight to each of the plurality of wavelengths, the weights corresponding to a transfer function of a chemical constituent; and an integrator device optically coupled to receive the component wavelengths from the first light amplitude modulator.

In some embodiments, an output of the integrator corresponds to a concentration of the chemical constituent. The spectrometer may comprise a splitter adapted to form a reference pathway with light from the light source. The spectrometer may further comprise a second light amplitude modulator disposed in the reference pathway and optically coupled to the wavelength selective device, the second light amplitude modulator comprising a plurality of addressable regions, each of the plurality of addressable regions being configured and arranged to modulate a corresponding at least one of the plurality of component wavelengths.

The light source may comprise a broadband source. Optionally, the light source comprises a plurality of narrowband sources. The wavelength selective device may comprise a dispersive device configured and arranged to divide light in the sample pathway into component wavelengths. The dispersive device may comprise a diffraction grating. The wavelength selective device may comprise a dispersive element configured and arranged to separate light in the sample pathway and the reference pathway into component wavelengths.

In some embodiments, the integrator device is configured and arranged to recombine a plurality of component wavelengths in the sample pathway. In some embodiments, the wavelength selective device comprises a dispersive device configured and arranged to divide light in the sample pathway into component wavelengths, and the integrator is comprised of a dispersive element configured and arranged to recombine the component wavelengths light of the sample pathway.

Optionally, the integrator device is comprised of a first integrator element configured and arranged to recombine component wavelengths of light in the reference pathway and a second integrator element configured and arranged to recombine component wavelengths of light in the sample pathway. In some embodiments, at least one of the first integrator element and the second integrator element comprises a diffraction grating. The integrator device may be comprised of an integrating sphere. In some embodiments, the integrator device is comprised of a first integrating sphere configured and arranged to recombine component wavelengths of light in the sample pathway and a second integrating sphere configured and arranged to recombine component wavelengths of light in the reference pathway.

The first light amplitude modulator may be a diffraction grating modulator. The first light amplitude modulator may be a MEMS-based diffraction grating modulator. In some embodiments, the first light amplitude modulator is a liquid crystal modulator. The first light amplitude modulator and the second light amplitude modulator may be disposed on common chip.

In some embodiments, the spectrometer comprises a detector unit optically coupled to an output of the integrator device. The spectrometer may comprise a processor adapted to actuate the first amplitude light modulator so as to sequentially transmit light consisting of a first set of wavelengths and light consisting of a second set of wavelengths, the second set of wavelengths being different than the second set of wavelengths.

The spectrometer may comprise a detector unit optically coupled to an output of the integrator, and further comprise a processor operatively coupled to the detector unit and adapted to determine a first amount of light comprising the reference pathway and a second amount of light comprising the sample pathway. The first amount of light and the second amount of light may both correspond to light consisting of a single wavelength. In some embodiments, the processor is operatively coupled to the first light amplitude modulator and the second light modulator, and is adapted to actuate at least one of the first modulator and the second light modulator in response to the first amount of light and the second amount of light. The processor may be adapted to actuate at least one of the first light modulator and the second light modulator to equalize the first amount of light with the second amount of light.

In some embodiments, the wavelength selective device comprises a dispersive element configured and arranged to separate light in the sample pathway into component wavelengths, and wherein the first light amplitude modulator is adapted to retro-reflect light in the sample pathway back onto the dispersive element, whereby the integrator comprises a portion of the dispersive element.

Yet another aspect of the invention is directed to a method of processing light, comprising the steps of: projecting light having at least one wavelength; splitting the light to form a portion of light in a reference pathway and a portion of light in a sample pathway; projecting the portion of light in the sample pathway through a sample; a first step of amplitude modulating the portion of the light in at least one of the reference pathway and the sample pathway; and detecting the portion of the light in the sample pathway and the portion of the light in the reference pathway after the first step of amplitude modulating.

The method of processing light may comprise a step of dividing at least the portion of light in the sample pathway into a plurality of component wavelengths, the step of dividing occurring after the step of projecting and before the first step of amplitude modulating. The first step of amplitude modulating may comprise separately amplitude modulating light at a first component wavelength and amplitude modulating light at a second component wavelength, in parallel.

The method of processing light may comprise a second step of amplitude modulating a portion of the light in the other of the reference pathway and the sample pathway. Optionally, the method of processing light may further comprise a step of dividing the portion of light in the reference pathway into component wavelengths.

Still another aspect of the invention is directed to a method of processing light, comprising: projecting light having a plurality of wavelengths; splitting the light to form a portion of light in a reference pathway and a portion of light in a sample pathway; projecting the portion of the light in the sample pathway through a sample; dividing the portion of the light in the sample pathway into a plurality of component wavelengths; dividing the portion of the light in the reference pathway into a plurality of component wavelengths; separately amplitude modulating at least two component wavelengths in the sample pathway; separately amplitude modulating at least two component wavelengths in the reference pathway; integrating light in the sample pathway after the step of amplitude modulating light in the sample pathway; and integrating light in the reference pathway after the steps of amplitude modulating light in the reference pathway. In some embodiments, the step of amplitude modulating light in the sample pathway comprises applying a corresponding weight to each of the plurality of component wavelengths, the weights corresponding to a transfer function of a chemical constituent. The step of amplitude modulating may comprise blocking at least one of the plurality of wavelengths, whereby the weight applied to the at least one of the plurality of wavelengths is substantially equal to zero.

Still another aspect of the invention is directed to a method of processing light, comprising steps of: producing light having a plurality of wavelengths in a sample pathway; dividing the light in the sample pathway into a plurality of component wavelengths; separately amplitude modulating at least two of the plurality of wavelengths to apply a corresponding weight to each of the at least two of the plurality of component wavelengths in the sample pathway, the weights corresponding to a transfer function of a chemical constituent; and integrating the at least two of the plurality of wavelengths after the step of separately amplitude modulating.

The step of integrating may result in an output corresponding to a concentration of the chemical constituent. The method may comprise a step of splitting the light to form a reference pathway prior to the step of separately amplitude modulating. The method may comprise a second step of separately modulating the at least two of the plurality of wavelengths to apply a corresponding weight to each of the at least two of the plurality of wavelengths in the reference pathway, the weights corresponding to the transfer function of the chemical constituent.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
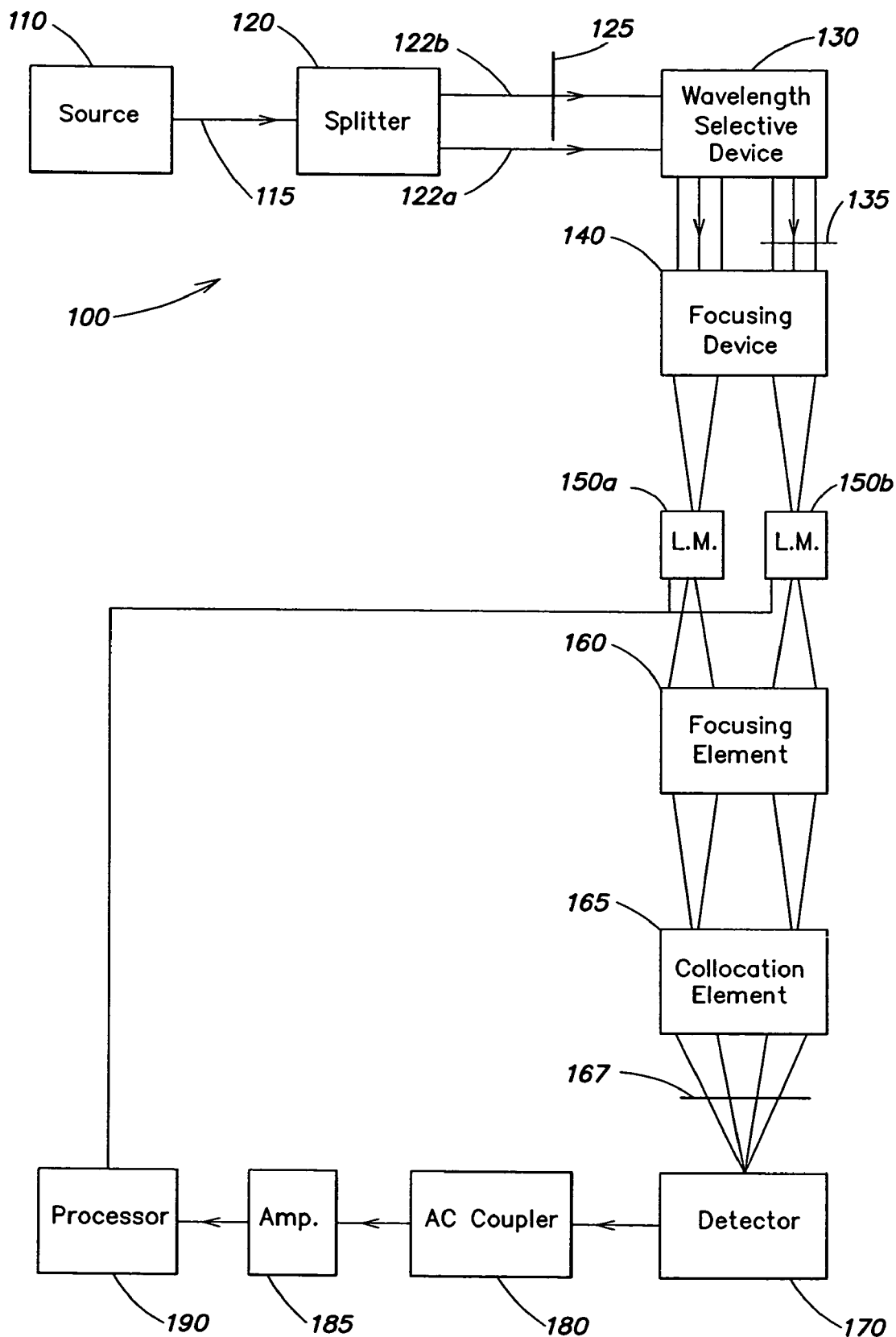
FIG. 1 is a functional block diagram of an exemplary embodiment of a light processor according to aspects of the present invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

FIG. 1 is a functional block diagram of an exemplary embodiment of a light processor 100 according to aspects of the present invention. For example, the light processor may be a spectrometer. Light processor 100 includes a light source 110; a splitter 120 to form a reference pathway 122a and sample pathway 122b; a wavelength selective device 130; a first focusing device to focus light in the sample pathway and/or light in the reference pathway onto a first light amplitude modulator 150a and a second light amplitude modulator 150b, respectively; a second focusing device to focus light from the sample pathway and/or the reference pathway onto a detector 170; a collocation device 165 to project light from the reference pathway and the sample pathway onto detector unit 170; an AC coupler 180; an amplifier 185; and a processor 190. A sample may be located, for example, at position 125 or position 135. It is to be appreciated that in the illustrated block diagram 100, although light (e.g., light in pathways 122a, 122b) is indicated as passing through blocks of the diagram, such indication is merely for illustrative purposes and is not meant to limit the invention. Accordingly, components illustrated in FIG. 1 may comprise reflective, refractive, diffractive components or components using any other suitable physical phenomenon.

Source 110 produces light 115 in a desired band of wavelengths from which spectral information is to be obtained by light processor 100. Source 110 may be any suitable narrowband or broadband light source, such as a spectroscopic source. For example, source 110 may be comprised of a single broadband source. Alternatively, a plurality of narrower band sources, each adapted to provide light of a different wavelength, may be combined to provide light at a plurality of wavelengths. The plurality of narrow band sources may be illuminated simultaneously or sequentially. In some embodiments, source 110 may be a tunable source (e.g., a tunable laser) or a multi-wavelength laser. It is to be appreciated that according to aspects of the present invention, source 110 may produce one or more wavelengths and one or more wavelengths may be used for analysis. It is also to be appreciated that in embodiments in which a single wavelength of light is produced at a given time, wavelength selective device 130 may be eliminated.

Splitter 120 may employ any suitable technique and/or structure such that a portion of the light from source 110 is separated from another portion of the light from source 110 to obtain reference pathway 122a and sample pathway 122b. For example, splitter 120 may be comprised of a conventional beam splitter. In some embodiments, the splitter may be comprised of a fiber optic component located to tap a portion of one of the sample pathway and the reference pathway to form the other of the sample pathway and the reference pathway. In yet another embodiment the splitter may simply comprise an opaque medium having a first aperture to form the reference pathway and a second aperture to form the sample pathway.

Wavelength selective device 130 receives light from the sample optical pathway and the reference optical pathway, and divides the light into component wavelengths, spatially. For example, in some embodiments, the wavelength selective device 130 may be dispersive element such as a diffraction grating or a prism which angularly separates the component wavelengths such that as the light propagates it is spatially divided into its component wavelengths.

Wavelength selective device 130 may be comprised of one or more wavelength selective elements. In embodiments employing multiple wavelength selective elements, each of the reference pathway and the sample pathway may have a corresponding wavelength selective element. By contrast, in embodiments employing a single wavelength selective element, light from each of the reference pathway and the sample pathway may impinge on the same wavelength selective element at distinct locations along the wavelength selective element and/or impinge the wavelength selective element at distinct angles. Although in the illustrated embodiment, the wavelength selective device is illustrated as being downstream of the splitter, in some embodiments the wavelength selective device may be located upstream of the splitter.

First light amplitude modulator 150a and second light amplitude modulator 150b may be any suitable device capable of selectively affecting the throughput of light at the wavelength or wavelengths to be analyzed. First light amplitude modulator 150a and second light amplitude modulator 150b may be any suitable light amplitude modulators, such as reflective modulators or transmissive light amplitude modulators. In some embodiments, light amplitude modulators 150a and/or 150b comprises a single region onto which multiple wavelengths are projected in a sequential manner (e.g., by sequential illuminating narrowband source comprising light source 110 as described above).

Alternatively, as described in greater detail below, the light amplitude modulators 150a and/or 150b may be spatial light amplitude modulators. For example, the modulators may be comprised of liquid crystal modulators or grating-based modulators having addressable regions, each addressable region being capable of providing selectable attenuation of a component wavelength. In such embodiments, each of the component wavelengths may be projected onto a corresponding addressable region to separately process the wavelengths at the same time (i.e., in parallel). In some embodiments, two or more component wavelengths may be processed by a same addressable region. An example of a suitable diffraction grating modulator is a MEMS-based diffraction grating modulator described in U.S. Pat. Appl. Ser. No. 09/975,169, titled ACTUATABLE DIFFRACTIVE OPTICAL PROCESSOR, filed Oct. 11, 2001, by Deutsch, et al. (referred to herein as Deutsch), the substance of which is hereby incorporated by reference. Projection of wavelengths onto corresponding addressable regions of a spatial light amplitude modulator is discussed in greater detail below with reference to FIG. 2C.

In some embodiments, a focusing device 140 is located intermediate the wavelength selective device 130 and the light amplitude modulators 150a, 150b such that the component wavelengths of light from the wavelength selective device 130 are concentrated (e.g., focused) and projected onto corresponding addressable regions of the modulators. Focusing device 140 may be any suitable focusing device, such as a lens, a mirror or a diffractive element having focusing power, and may comprise separate elements, one for each of the reference pathway and the sample pathway. For example, in embodiments employing diffraction grating modulators, the wavelengths may be focused onto the grating elements of the modulator. However, even in such embodiments, focusing device 140 may not be necessary. For example, by placing the diffractive spatial light amplitude modulator suitably close to wavelength selective device 130, adequate performance may be achieved, without focusing.

Detector unit 170 is located to receive light from modulators 150a, 150b, thereby measuring the light absorbed by the sample. In some embodiments, detector unit 170 comprises a single detector to receive light from both the reference pathway and the sample pathway. The single detector may comprise a single detector element or an array of detector elements (e.g., a photodiode array). As described in greater detail below, in some embodiments, the single detector may be a spatial detector, such as an array of detector elements in which each detector element detects a corresponding component wavelength (from both of the reference pathway and the sample pathway), and in other embodiments the single detector may comprise only a single detector element upon which one or more wavelengths are projected (from both of the reference pathway and the sample pathway). The light from a plurality of such wavelengths may be projected onto the detector simultaneously or sequentially.

In some embodiments, modulators 150a and 150b may be arranged to direct light projected thereon in a manner such that light from both the reference pathway and the sample pathway, at one or more selected wavelengths, is projected onto a common detector of detector unit 170. However, a collocation device 165 may be included to direct the light from both light amplitude modulator 150a and light amplitude modulator 150b onto the common detector. Collocation device 165 may comprise any device suitable for projecting light from the light amplitude modulators in a manner such that light, from both the reference pathway and the sample pathway is projected onto the common detector. In some embodiments, at least a portion of the light from light amplitude modulator 150a and second spatial light amplitude modulator 150b is projected onto a common detector element of the common detector. And in some embodiments, the light projected onto a common detector element from the sample pathway and the reference pathway is of a same component wavelength.

Although the embodiments described above were directed to embodiments in which detector unit 170 comprises a single detector to receive light from both the reference pathway and the sample pathway, the invention is not so limited. In some embodiments, detector unit 170 includes a first detector (comprising a single detector element or an array of detector elements) to receive light from light amplitude modulator 150a, and a second detector (comprising a single detector element or an array of detector elements) to receive light from second light amplitude modulator 150b.

As is discussed in greater detail below, in some embodiments of the invention, a detector included in detector unit 170 alternately receives light from first modulator 150a and light from second modulator 150b so as to generate an output having an AC component. In other embodiments that have a first detector to receive light from light amplitude modulator 150a, and a second detector to receive light from second light amplitude modulator 150b, the signals from the two detectors may be combined in an alternating manner using suitable electronic techniques to combine (i.e., multiplex) the signals to obtain an AC component.

In some embodiments, a focusing device 160 may be included to increase the efficiency with which light is gathered from light amplitude modulators 150a, 150b and projected onto detector unit 170. Focusing device 160 may include a single device for focusing light from both light amplitude modulator 150a and light amplitude modulator 150b or may include two focusing elements (not shown), one corresponding to light amplitude modulator 150a and one corresponding to light amplitude modulator 150b.

Focusing device 160 may be any suitable single element or multielement focusing device. For example, focusing device 160 may comprise one or more refractive, reflective and/or diffractive components.

Processor 190 processes an output from detector 170 to obtain information regarding the absorption spectrum of a sample by processing the output in any suitable manner. For example, processor 190 may determine an amount of light in the sample pathway and/or the reference pathway detected by the detector unit. The processor may determine the presence and/or quantity (e.g., a concentration) of one or more constituents in a sample of matter. In some embodiments, processor 190 controls light amplitude modulators 150a and 150 to achieve selected throughputs for the addressable regions of the light amplitude modulators. In some embodiments, processor 190 controls one or both of the light amplitude modulators in response to an amount of light in the sample pathway or the reference pathway as measured by detector 170. For example, calibration may be achieved as described below.

If light processor 100 is operated in an AC manner (as described above), an AC coupler 180 may be included to filter the detector output to remove the DC signal (i.e., the portion common to the sample pathway and the reference pathway) from the absorption information-carrying AC signal. For example, AC coupler 180 may be a capacitor or a phase-sensitive device such as a lock-in amplifier. It is to be appreciated that, because in some embodiments of AC light processors the detected signal is digitized, removing the DC component of the signal prior to digitizing results in an increased dynamic range. It is also to be appreciated that an AC coupler is not essential to the present invention, and the AC coupler may be omitted, for example, in a light processor that is not operated as an AC light processor. In such light processors, the benefits of calibration as described herein below may still be attained.

According to aspects of the present invention, an advantage of light processor 100 having light amplitude modulator 150a and/or light amplitude modulator 150b is that light processor 100 may be calibrated to reduce or eliminate spectral differences between the sample pathway and the reference pathway. Calibration may be achieved by operating the light processor without a sample, and actuating the addressable regions of one or both of light amplitude modulators 150a, 150b, to achieve equal signal amplitudes (e.g., as measured at detector 170) at a selected component wavelength. Equalization may be repeated for any or all component wavelengths. It is to be appreciated that in light processors according to aspects of the invention, a single addressable region of a modulator and/or a single detector element of a detector unit may process one or more component wavelengths.

In some embodiments, an addressable region of one of light amplitude modulators 150a, 150b is actuated by processor 190 to achieve equalization at a selected component wavelength. Typically, the actuatable region, corresponding to the selected wavelength, in the pathway having a higher output at the selected wavelengths (e.g., as determined by detector 170) is actuated to achieve equalization. However, any suitable means of attenuation or amplification may be used to achieve equalization.

In embodiments of light processors in which light from sample pathway and the reference pathway fall on a common detector in detector unit 170 (as described above), light amplitude modulators 150a and 150b may be actuated in an alternating manner to achieve an AC output. In such embodiments, after the light processor has been calibrated, the addressable regions of light amplitude modulators 150a, 150b, are actuated between a calibrated state, providing equalized transmission (referred to herein as full equalized transmission), and a zero transmission state (i.e., in which light is fully removed from a pathway).

That is, in one embodiment, to achieve an AC output, all addressable regions for a given light amplitude modulator 150a are operated at full equalized transmission at a first instance of time and at an alternate instance of time, the light amplitude modulator 150a is operated at zero transmission; and all addressable regions of light amplitude modulator 150b are operated at full equalized transmission when light amplitude modulator 150a is at a state of zero transmission and at zero transmission when light amplitude modulator 150a is a full equalized transmission. Accordingly, light amplitude modulators 150a and 150b operate in a manner similar to a chopper, and an AC output may thereby be obtained from detector 170. It is to be appreciated that for a diffraction based modulator, zero transmission means light is diffracted out of the relevant pathway.

In a given light processor, the reference pathway may have a higher output than the sample pathway for some wavelengths, and for other wavelengths the sample pathway may have higher output than the reference pathway. Accordingly, to achieve a calibrated state, the reference pathway will be attenuated for some component wavelengths and for other component wavelengths the sample pathway will be attenuated. However, in some embodiments, it may be possible to attenuate only the sample pathway or only the reference pathway to achieve a calibrated state. For example, a neutral density filter may be placed in one of the pathways or splitter 120 may be appropriately configured such that one pathway has a higher throughput for all component wavelengths. In such embodiments, only one modulator 150a, 150b may be necessary (i.e., only in the pathway to be attenuated to achieve a calibrated state). In such embodiments, if the light processor is to be operated in an AC manner, an optical switching device 167, such as a switching mirror, may be used in a conventional manner to provide an AC signal.

Figure 2A:
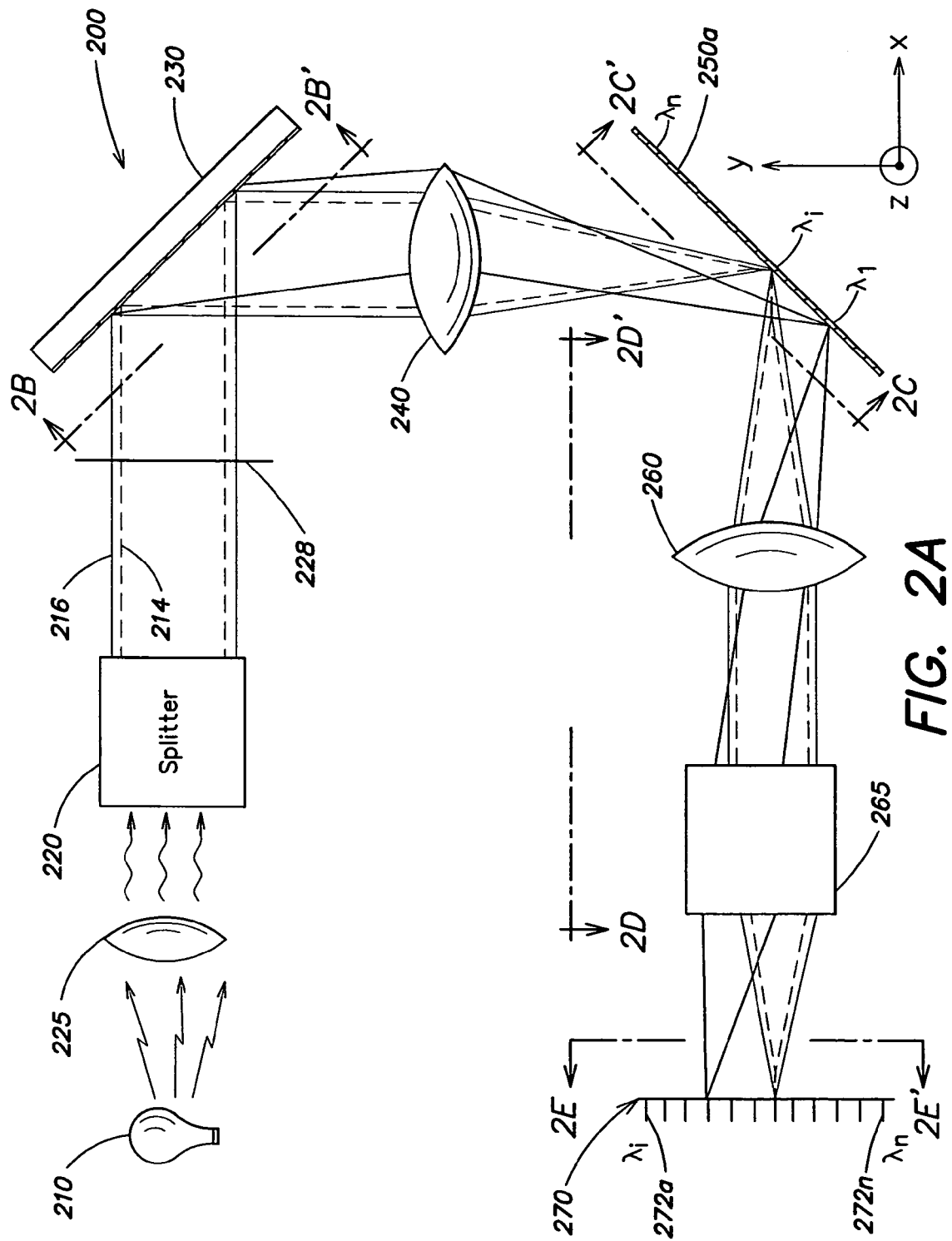
FIG. 2A is a schematic illustration of an exemplary embodiment of a spectrometer according to aspects of the present invention.

FIG. 2A is a schematic illustration of an exemplary embodiment 200 of spectrometer according to aspects of the present invention. A broadband lamp 210 produces light at wavelengths at which samples are to be measured. A collimator 225 is followed by a beam splitter 220 to produce a reference pathway 214 and a sample pathway 216. A sample is located at location 228.

Figure 2B:
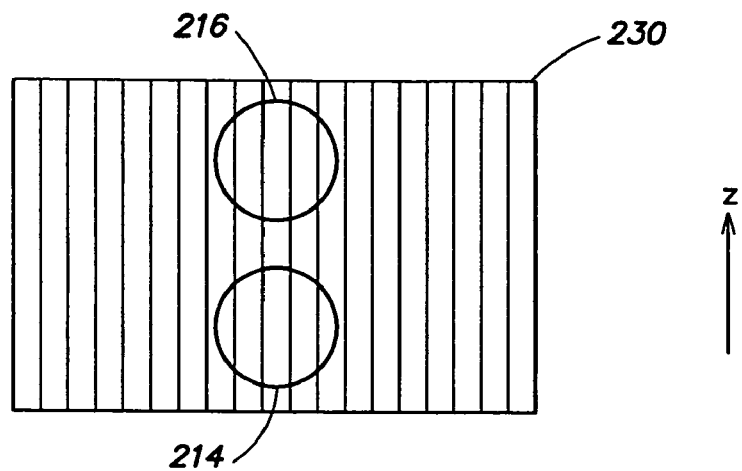
FIG. 2B is a cross sectional view of the spectrometer illustrated in FIG. 2A taken along lines 2B–2B' illustrating the relative positions of sample pathway and reference pathway impinging on a wavelength selective element.

Light in reference pathway 214 and sample pathway 216 impinge on a grating-based wavelength selective element 230 thereby angularly dispersing the wavelength components of each pathway. In the view of FIG. 2A, sample pathway 216 is in front of reference pathway 214. FIG. 2B is a cross sectional view of the spectrometer illustrated in FIG. 2A taken along lines 2B–2B' illustrating the relative positions of sample pathway 216 and reference pathway 214 as they impinge on a wavelength selective element 230.

Referring again to FIG. 2A, a lens 240 (comprising one or more lens elements) is located between grating 230 and spatial light amplitude modulators 250a, 250b such that concentrated light from the sample pathway 216 and concentrated light from the reference pathway 214 are projected onto spatial light amplitude modulator 250a and spatial light amplitude modulator 250b (illustrated in FIG. 2C), respectively. In some embodiments, lens 240 is located telecentrically between wavelength selective element 230 and spatial light amplitude modulators 250a, 250b. In some embodiments, lens 240 may be replaced by two lenses (not shown), one for each of the sample pathway and the reference pathway.

Figure 2C:
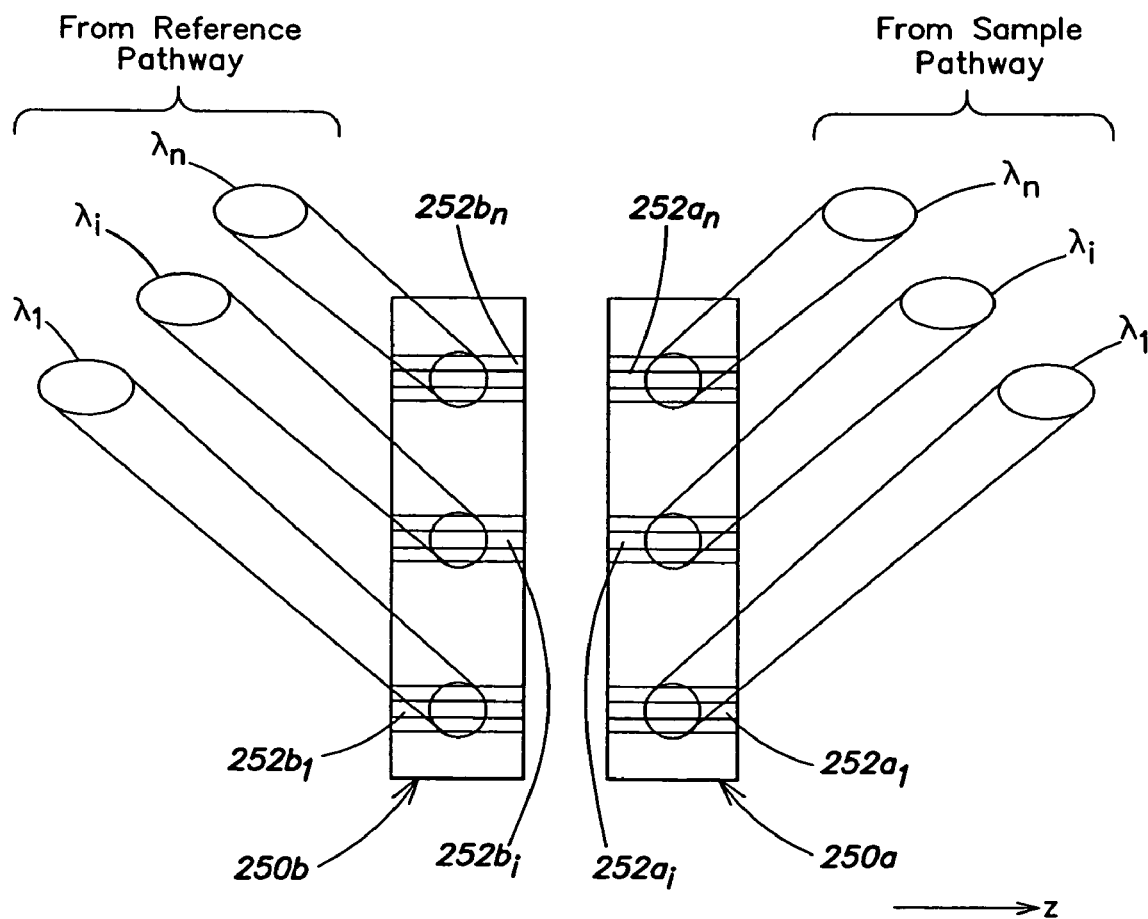
FIG. 2C is a cross sectional view of the spectrometer illustrated in FIG. 2A taken along lines 2C–2C' illustrating component wavelengths $\lambda_1$–$\lambda_n$ in the reference pathway and component wavelengths $\lambda_1$–$\lambda_n$ in the sample pathway impinging on a first light amplitude modulator and a second light amplitude modulator, respectively.

FIG. 2C is a cross sectional view of the spectrometer illustrated in FIG. 2A taken along lines 2C–2C' illustrating component wavelengths $\lambda_1$–$\lambda_n$ in the reference pathway being projected onto light amplitude modulator 250b, and component wavelengths $\lambda_1$–$\lambda_n$ in the sample pathway being projected onto light amplitude modulator 250a. Each wavelength $\lambda_i$ in the sample pathway is projected onto a corresponding addressable region of spatial light amplitude modulator 250a, and each wavelength $\lambda_i$ in the reference pathway is projected onto a corresponding addressable region of spatial light amplitude modulator 250b. It is to be appreciated that a given light amplitude modulator 250a and 250b can be actuated to eliminate (i.e., block) or reduce light at the selected component wavelength during a measurement for which the component wavelengths are unused or undesirable. For example, a wavelength may not be used during a measurement of a particular spectral signature.

In the illustrated exemplary embodiment, modulators 250a, 250b are grating-based, reflective, diffractive MEMS devices, such as those described in Deutsch, and having individually addressable actuatable regions. The addressable regions $252a_{1-n}$ of modulator 250a and the addressable regions $252b_{1-n}$ of modulator 250b allow control of the component wavelengths of the sample pathway 216 and the reference pathway 214, respectively. By actuating the individually addressable regions of spatial light amplitude modulators 250a and 250b it is possible to affect a change in the throughput of the wavelength bands of the sample pathway and the reference pathway, respectively and thereby obtain a calibrated (i.e., equalized) state for one or more of wavelengths $\lambda_i$, as described above. In some embodiments, MEMS-based diffraction grating modulators 250a and 250b are capable of achieving an attenuation of greater than 20 dB, between a full equalized state and an "off state." In some embodiments, it is desirable that a light amplitude modulator be actuatable in a continuous manner between an on state (e.g., a full equalization state) and an off state.

In some embodiments, spatial light amplitude modulators 250a, 250b are manufactured side-by-side on a single chip (e.g., a common silicon chip). It is to be appreciated that in such embodiments, the alignment of the light amplitude modulators 250a, 250b in a manner such that the same wavelengths impinge on corresponding addressable regions of the light amplitude modulators, may be more easily maintained and alignment of focusing element 240 and 260 and collocation device 265 relative to the light amplitude modulators may be simplified.

Referring again to FIG. 2A, in the illustrated embodiment, the wavelengths $\lambda_1$–$\lambda_n$ of the sample pathway 216 are focused onto spatially separated locations of detector 270 by lens 260. Similarly, the wavelengths $\lambda_1$–$\lambda_n$ of the reference pathway 214 are focused onto spatially separated locations of detector 270 by lens 260. A prism 265 operates to collocate the focused wavelengths of spatial light amplitude modulator 250a and spatial light amplitude modulator 250b, and thereby causes light at like wavelengths from the sample pathway 216 and reference pathway 214 to be projected on common detector elements $272_{a-n}$ of detector 270.

Figure 2D:
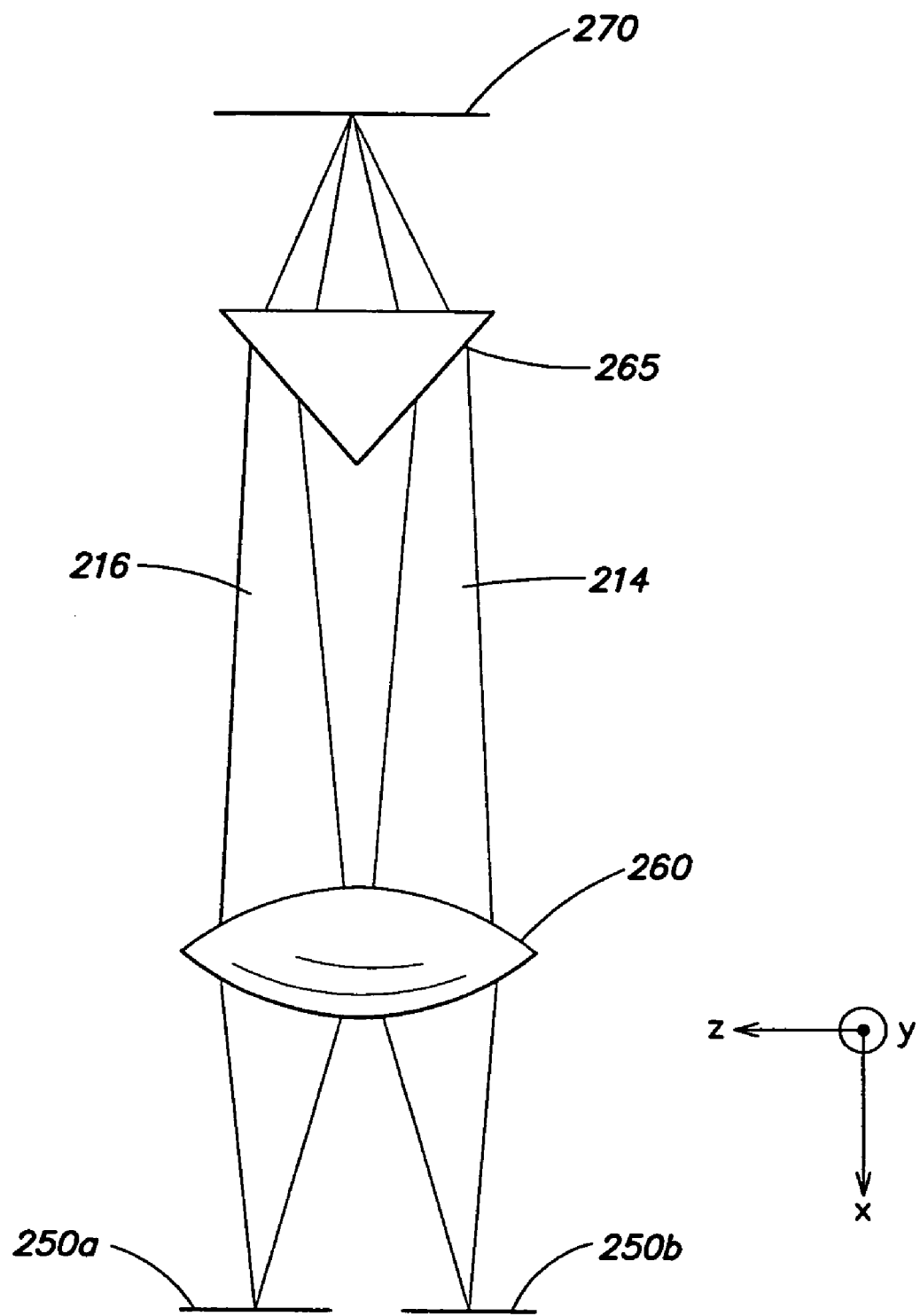
FIG. 2D is a cross sectional view of the spectrometer illustrated in FIG. 2A taken along lines 2D–2D' illustrating a reference beam and a sample beam impinging on a detector.

FIG. 2D is a cross sectional view of the spectrometer illustrated in FIG. 2A taken along lines 2D–2D' illustrating light being collocated on detector 270. Light in the sample pathway 216 and the reference pathway 214 is projected from light amplitude modulators 250a and 250b, respectively, through lens 260 and collocation device 265 onto detector 270.

Figure 2E:
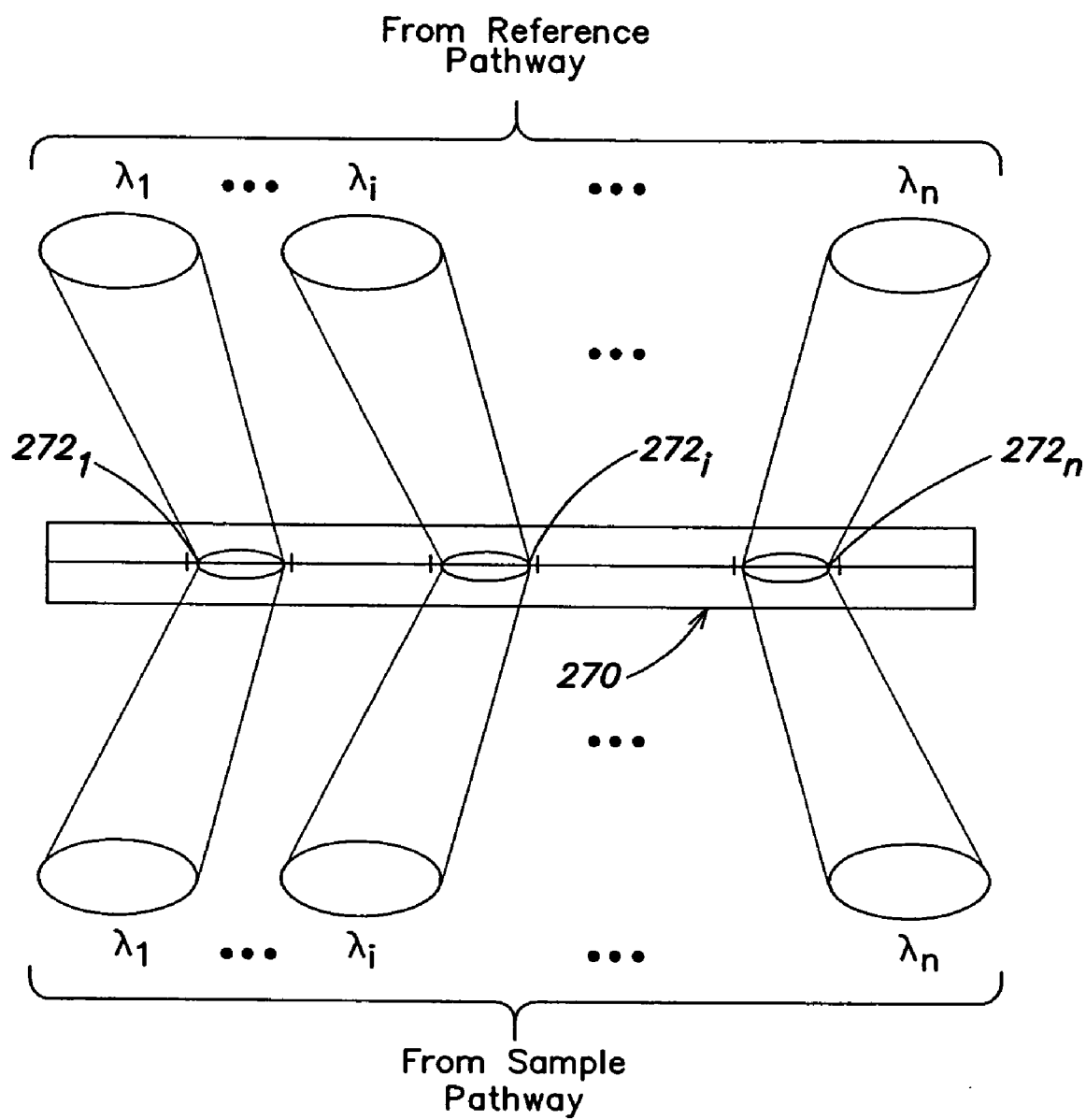
FIG. 2E is a cross sectional view of the spectrometer illustrated in FIG. 2A taken along lines 2E–2E' of FIG. 2A illustrating component wavelengths $\lambda_1$–$\lambda_n$ in the reference pathway and component wavelengths $\lambda_1$–$\lambda_n$ in the sample pathway impinging on a detector.

FIG. 2E is a cross sectional view of the spectrometer illustrated in FIG. 2A taken along lines 2E–2E' illustrating collocation of the wavelengths $\lambda_1$–$\lambda_n$ from the reference pathway and the wavelengths $\lambda_1$–$\lambda_n$ from the sample pathway, onto an array detector. Each wavelength $\lambda_i$, from both the reference pathway and the sample pathway, is projected onto a corresponding common element 272i of detector 270.

Figure 3:
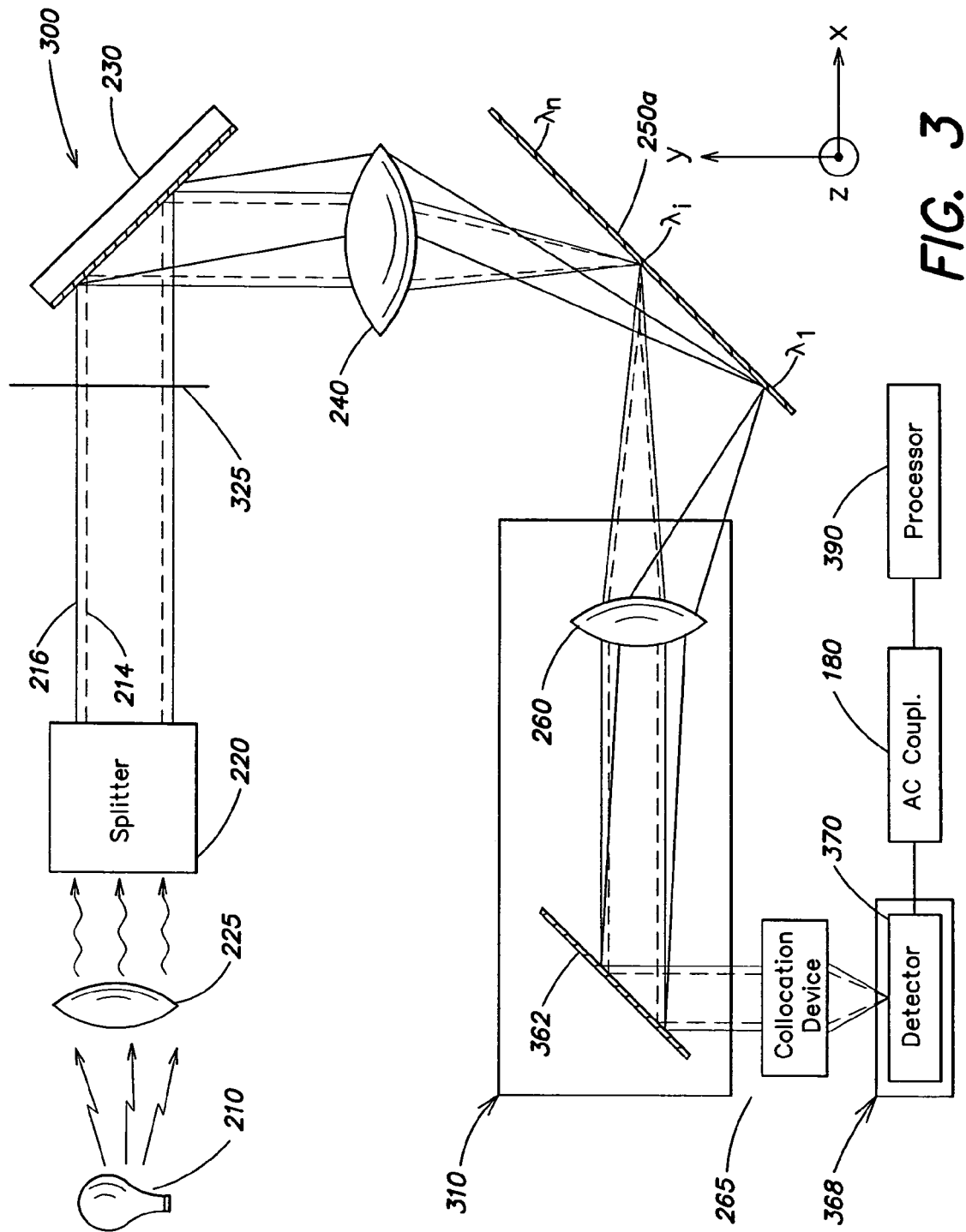
FIG. 3 is a schematic illustration of another exemplary embodiment of a spectrometer according to aspects of the present invention.

FIG. 3 is a schematic illustration of another exemplary embodiment of a spectrometer 300 according to aspects of the present invention. Except for the addition of dispersive element 362, spectrometer 300 contains elements similar to spectrometer 200. Common elements of the device will not be discussed, other than where desirable for clarification.

The illustrated spectrometer may be configured to perform chemometric processing in real time. In some embodiments, the spectrometer is configured to sequentially process component wavelengths of the sample pathway and thereby provide an output from a detector unit 368 that is similar in form to a monochromator-type spectrometer or an ND-type spectrometer. Spectrometers according to this aspect of the invention may include a reference pathway. However, the invention is not so limited and a reference pathway (and the corresponding splitter) may be omitted.

Source 210 is adapted to produce a plurality of component wavelengths. The number of component wavelengths and the specific wavelengths used in a given application depends, for example, on the nature of the sample to be measured. Spectrometer 300 includes an integrator device 310. Integrator device 310 may be comprised of any device(s) capable of producing an output indicative of the combined strength of the component wavelengths of reference pathway 214 and/or sample pathway 216 that are input into integrator device 310.

In the illustrated embodiment, lens 260, and dispersive element 362 (e.g., a diffraction grating or a prism) form integrator device 310. Dispersive element 362 is configured and arranged to recombine the spatially separated wavelengths of the reference pathway and the sample pathway. In the illustrated embodiment, dispersive element 362 is disposed in a similar location to detector 270 (shown in FIG. 2A above) and as a result, the light in the component wavelengths of the sample pathway that are projected onto dispersive element 362 are recombined (i.e., they are integrated). Light in the component wavelengths of the reference pathway may be similarly integrated.

The integrator device may be comprised of an integrator element to integrate the wavelengths of sample pathway and an integrator element to integrate the wavelengths of the reference pathway. Alternatively the integrator device may be comprised of a single element to integrate the wavelengths in both the sample pathway and the reference pathway. In some embodiments, integration module 310 may comprise an integrating sphere (not shown).

In some embodiments a detector unit 368 is coupled to the output of integrator device 310. Detector unit may be comprised of a single detector 370 adapted to receive light from both the sample pathway and the reference pathway. A collocation device 265 may be used to project light in the sample pathway and light in the reference pathway onto the detector. In some embodiments, detector unit 368 may be comprised of a first detector adapted to receive light from the sample pathway and the second detector to receive light from the reference pathway.

Detector 370 may be comprised of only a single element such that the light in the sample pathway and/or the reference pathway projected thereon provides a single output from detector 370. Alternatively, detector 370 may be comprised of a plurality of detector elements, and may be capable of combining the detected values of each detector element to achieve a single, output. In other embodiments, a processor 390 may combine the outputs of the detector elements.

Spectrometer 300 may be operated to achieve an output at detector unit 368 that is similar to a monochromator-type or an ND-type spectrometer by actuating light amplitude modulators 250a in an appropriate manner such that appropriate component wavelengths in the sample pathway are attenuated or blocked (by diffracting light at the appropriate component wavelength such that a portion of the light is diffracted out the sample pathway). For example, light amplitude modulator 250a may be actuated such that light emerging from the light amplitude modulator has a component wavelength (or combination of component wavelengths) similar to the component wavelengths present in a monochomator-type or ND-type spectrometer; and actuation maybe varied over time such that any suitable sequence of component wavelengths may be output. Accordingly, outputs at detector unit 368 may correspond to a sequence of component wavelengths similar to a monochromator-type spectrometer or an ND-type spectrometer. In embodiments of spectrometer 300 that include a reference pathway, a second amplitude modulator 250b is located in the reference pathway as was illustrated in FIG. 2C above.

In embodiments that include both a sample pathway and the reference pathway, spectrometer 300 may be calibrated in a manner similar to spectrometer 200 discussed above with reference to FIG. 2A by first operating spectrometer 300 without a sample. In such embodiments, light amplitude modulator 250b is actuated such that light emerging from light amplitude modulator 250b includes component wavelength (or combination of component wavelengths) similar to those in the sample pathway (i.e., certain wavelengths in the reference pathway may be attenuated or blocked to achieve a monochomator-type output or an ND-type spectrometer output). Additionally, spectrometer 300 may be operated as an AC spectrometer. Accordingly, the light amplitude modulators may be operated in an alternating manner as described above with reference to FIG. 2A. Alternatively, in embodiments in which a first detector is used to detect light in the sample pathway and a second detector is used to detect light in the reference pathway, the outputs may be combined in an alternating manner, to form an AC signal. In some embodiments, an AC coupler 180 may be implemented to filter the output of detector unit 368.

As will be described in greater detail below, spectrometer 300 may be configured such that an output of detector unit 368 is proportional to the concentration of a chemical present in the sample (i.e., a chemical constituent of the sample). Accordingly, the concentration of the constituent may be determined in real time, thereby reducing or eliminating the need for post processing, and the time, equipment, and program development associated therewith.

For each chemical constituent present in a sample, there exists an optical transfer function, as determined by the absorption spectrum of a sample located in the sample pathway, and expressed by Beer's Law for mixtures.

$$I(\lambda) = I_0(\lambda) e^{-\Sigma \alpha_i(\lambda) dc_i}; \qquad \text{Equation 1}$$

where the summation is performed over the variable i;

$I_0(\lambda)$ is the intensity of the light measured at the detector for a empty cell;

$\alpha_i$ is the absorption coefficient for the $i^{th}$ constituent;

d is the pathlength, and $c_i$ is concentration of the $i^{th}$ constituent.

The absorbance may be expressed as:

$$\Sigma \alpha_i(\lambda) dC_i = -\ln\left(\frac{I(\lambda)}{I_0(\lambda)}\right)$$

The light at wavelength $\lambda$ is reduced by absorption, as follows:

$$I(\lambda) \sim I_0(\lambda) - \delta I(\lambda);$$

where $\delta I(\lambda)$ is the intensity reduction due to absorption by the sample.

For weak absorbing constituents, existing at sufficiently low concentrations in the sample (typically, in the parts-per-thousand range or below), the following approximation may be made.

$$\Sigma \alpha_i(\lambda) dc_i \sim \delta I(\lambda)/I_0(\lambda); \quad \text{Equation 2}$$

It follows that the output of a spectrometer at each wavelength can be mathematically modeled by the following matrix equation. While the illustrated matrix equation includes three chemical constituents, a system measuring any suitable number of constituents is within the scope of the present invention.

$$\begin{pmatrix} S_1 \\ S_2 \\ \vdots \\ \vdots \\ S_n \\ \vdots \\ \vdots \\ S_N \end{pmatrix} = d \begin{pmatrix} A_{1a} & A_{1b} & A_{1c} \\ A_{2a} & A_{2b} & A_{2c} \\ \vdots & \vdots & \vdots \\ \vdots & \vdots & \vdots \\ A_{na} & A_{nb} & A_{nc} \\ \vdots & \vdots & \vdots \\ \vdots & \vdots & \vdots \\ A_{Na} & A_{Nb} & A_{Nc} \end{pmatrix} \begin{pmatrix} C_a \\ C_b \\ C_c \end{pmatrix} \quad \text{Equation 3}$$

where the column vector (C) is a matrix of the concentrations values of each of three constituents (a, b, and c) that are to be determined;

where column vector (S) contains values $S_i$ equal to $$S_i = -\delta I(\lambda_i)/I_0(\lambda_i); \text{ and}$$

where matrix (A) is an N×3 matrix that contains known spectral absorbances $\alpha$ (i.e., transfer coefficients) for each constituent at each of N wavelengths.

Equation 3 may be solved for the concentration values C by inverting matrix A and multiplying the inverted matrix by column vector S. Typically, matrix A is a non-square matrix. Accordingly, an estimate of the concentrations may be achieved by multiplying column vector S by an inverse matrix $\tilde{A}$ found using a "partial least squares" method, in which the pseudo-inverse of the matrix (A) is found. For example, a pseudo-inverse may be found using singular value decomposition.

If a pseudo inverse is denoted by matrix $\tilde{A}$, a corresponding estimate of each of the three concentrations can be determined from the measured intensities using the following equation.

$$\begin{pmatrix} \tilde{C}_a \\ \tilde{C}_b \\ \tilde{C}_c \end{pmatrix} = \begin{pmatrix} \tilde{A}_{a1} & \tilde{A}_{a2} & \cdots & \cdots & \tilde{A}_{an} & \cdots & \tilde{A}_{aN} \\ \tilde{A}_{b1} & \tilde{A}_{b2} & \cdots & \cdots & \tilde{A}_{bn} & \cdots & \tilde{A}_{bN} \\ \tilde{A}_{c1} & \tilde{A}_{c2} & \cdots & \cdots & \tilde{A}_{cn} & \cdots & \tilde{A}_{cN} \end{pmatrix} \begin{pmatrix} I_1 \\ I_2 \\ \vdots \\ I_n \\ \vdots \\ I_N \end{pmatrix} \quad \text{Equation 4}$$

According to an aspect of the present invention, each row of matrix Equation 2 represents a set of analog weights that may be applied to corresponding wavelengths of the sample pathway. For example, coefficients $\tilde{A}_{a1}$–$\tilde{A}_{aN}$ correspond to weights to be applied to light at each of the component wavelengths 1 through N of constituent "a" to measure the amount of the constituent in a sample. That is, if light at the component wavelengths in spectrometer 300 is projected onto a modulator 250a and the throughputs are attenuated according to the coefficients, and the component wavelengths so attenuated are summed (e.g., integrated by integration module 310), the result is proportional to the concentration of the corresponding constituent and may be determined in real time.

In some embodiments, coefficients corresponding to constituents a, b, c . . . n are applied in a sequence. For example, spatial light amplitude modulator 250a is first actuated to apply coefficients $\tilde{A}_{a1}$–$\tilde{A}_{aN}$, corresponding to constituent "a", and subsequently coefficients $\tilde{A}_{i1}$–$\tilde{A}_{iN}$ corresponding to each constituent "i" are applied to the spatial light amplitude modulator. Accordingly, outputs for each constituent to be measured can be read from detector unit 368, sequentially.

In practice, because the above equations presume a fully compensated stable and spectrally flat lamp characteristic, there is an advantage to using a calibration technique as discussed above with reference to FIG. 2A to achieve a calibrated state. By applying coefficients to light amplitude modulators 250a and/or 250b according to matrix A' (or an estimate thereof) and superposing a calibration onto the coefficients, an output compensating for detector and/or source variations may be provided. Further, if the spectrometer is operated in an AC mode, for example, by alternating between the sample pathway and the reference pathway as described above, an output of a detector receiving such an AC signal may be AC filtered by AC coupler 180 to eliminate a component of the detected light that is common to sample pathway and the reference pathway. In such an embodiment, the amplitude of the resultant AC signal is proportional to the amount of the constituent in the sample.

In some embodiments, a further calibration step may be performed on the spectrometer 300, so that an output of detector 300 is equal to an absolute concentration measurement. For example, by placing a sample having a known concentration of constituents a, b, c at sample location 325 and measuring an output at detector 370, a calibration factor may be obtained. Subsequent outputs, in which a sample of matter is placed at sample location 325 can be multiplied by the calibration factor to determine an absolute concentration value of the measured constituent of the sample.

In some embodiments, if a coefficient $\tilde{A}$ of a particular constituent (or an estimate thereof) is zero, or is deemed to be insignificantly small relative to the other coefficients for the particular constituent, it may be desirable to configure the addressable region of spatial light amplitude modulator 250a and/or spatial light amplitude modulator 250b corresponding to that coefficient, such that the throughput of the light at the component wavelength is substantially zero (i.e., the addressable region of a modulator 250*a*, 250*a* removes (also referred to as blocks) the wavelength from the corresponding pathway, including any background light). In such a manner it is possible to remove all light at the wavelength from the corresponding pathway, thereby reducing the shot noise present in a measured output.

Figure 4A:
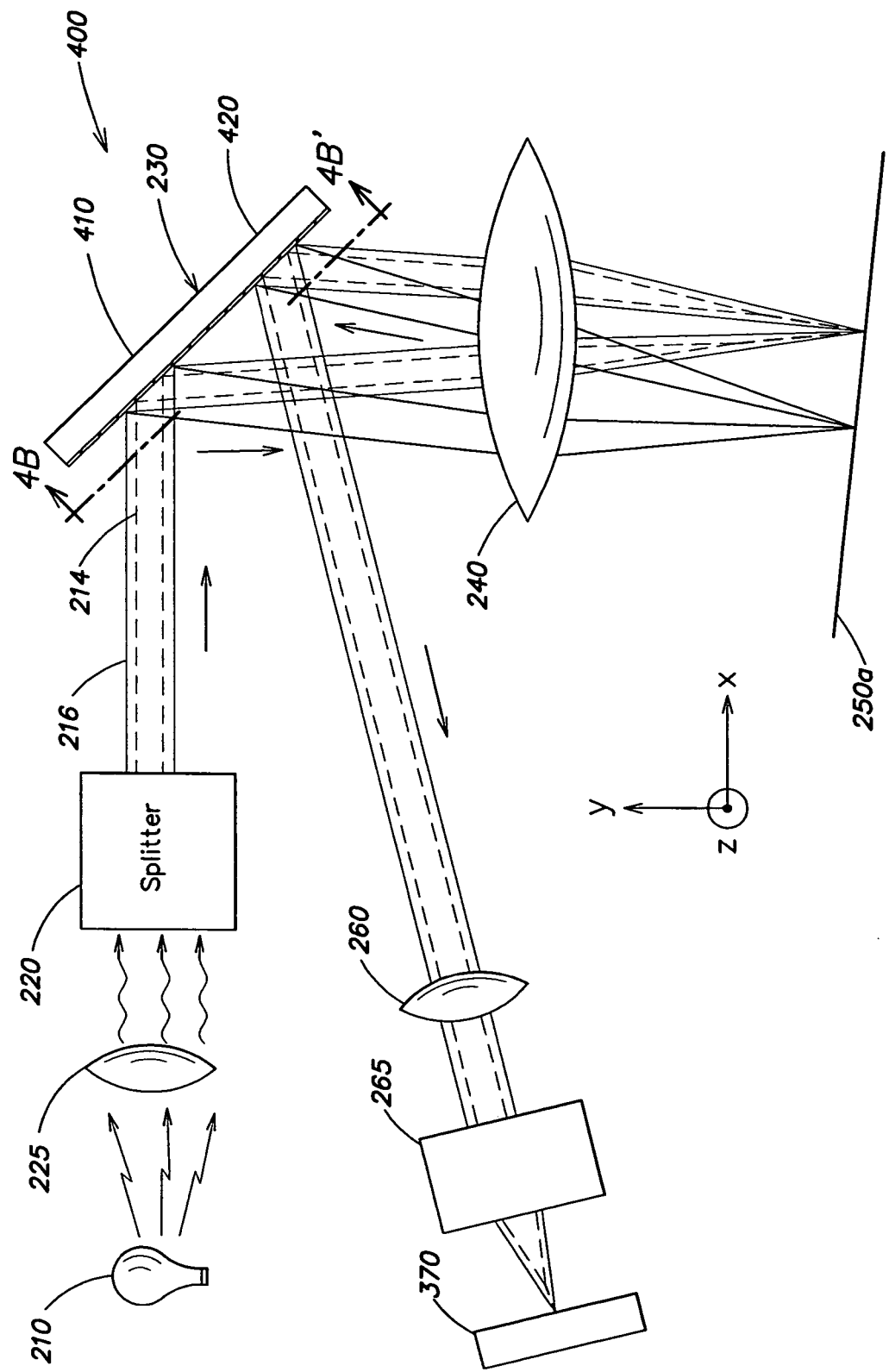
FIG. 4A is a schematic illustration of an exemplary embodiment of still another exemplary embodiment of a spectrometer according to aspects of the present invention.
Figure 4B:
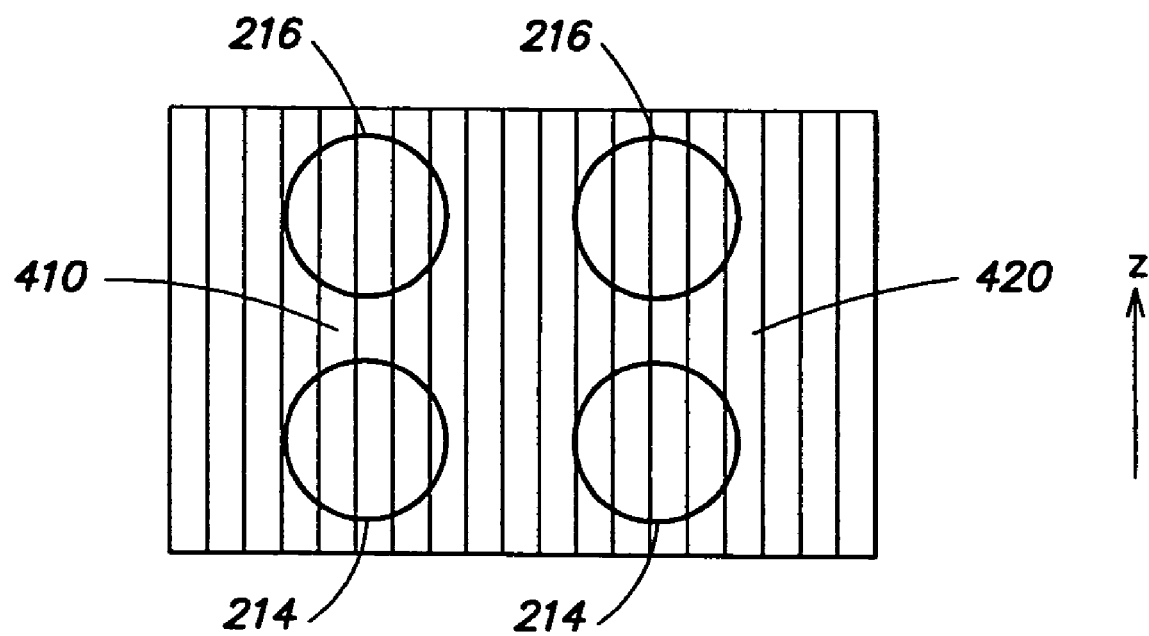
FIG. 4B is a cross sectional view of the spectrometer illustrated in FIG. 4A taken along lines 4B–4B' illustrating a sample pathway and a reference pathway impinging on a wavelength selective element.

FIG. 4A is a schematic of still another embodiment of a spectrometer 400 according to aspects of the present invention. In the embodiment illustrated in FIG. 4, source 210, collimator 225 and splitter 220 provide light in reference pathway 214 and sample pathway 216 similar to the spectrometer illustrated in FIG. 3 above. However, in spectrometer 400, modulator 250*a* and modulator 250*b* (not visible in FIG. 4) are adapted to retro-reflect light in sample pathway 216 and light in reference pathway 214 onto wavelength selective element 230, in a manner such that an input beam impinges on wavelength selective element 230 at a location 410 and an output beam impinges on wavelength selective element 230 at a location 420 and dispersive element 362 (illustrated in FIG. 3) can be eliminated. Accordingly, in some applications, spectrometer 400 may provide a reduced size and reduced cost relative to spectrometer 300. FIG. 4B is a cross sectional view of the spectrometer illustrated in FIG. 4A taken along lines 4B–4B' illustrating sample pathway 216 and reference pathway 214 impinging on wavelength selective element 230 at two locations 410 and 420.

Referring again to FIG. 4A, it is to be appreciated that spectrometer 400 has an integrator device similar to FIG. 3. In spectrometer 400, the integrator device is formed by a portion of wavelength selective element 230 and lens 260.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A light processor, comprising:
   a light source adapted to produce light having at least one wavelength;
   a splitter adapted to form a reference pathway and a sample pathway with the light, the sample pathway adapted to receive a sample;
   a first light amplitude modulator optically coupled to the splitter and disposed in one of the reference pathway and the sample pathway;
   a second light amplitude modulator optically coupled to the splitter and disposed in the other of the reference pathway and sample pathway; and
   a detector unit optically coupled to the first light amplitude modulator, and adapted to receive light from the sample pathway and light from the reference pathway;
   wherein at least one of the first light amplitude modulator and the second light amplitude modulator is a grating modulator.

2. The light processor of claim 1, wherein the light source comprises a broadband source.

3. The light processor of claim 2, wherein the broadband source comprises a plurality of narrowband sources, each adapted to produce light at a different wavelength.

4. The light processor of claim 2, further comprising a wavelength selective device operatively disposed intermediate the light source and the first light amplitude modulator, and adapted to divide light in the reference pathway and light in the sample pathway into a plurality of component wavelengths.

5. The light processor of claim 4, wherein the wavelength selective device comprises a first wavelength selective element configured and arranged to divide light in the sample pathway into component wavelengths and a second wavelength selective element configured and arranged to divide light in the reference pathway into component wavelengths.

6. The light processor of claim 4, wherein the wavelength selective device comprises a dispersive element.

7. The light processor of claim 1, wherein the first light amplitude modulator and the second light amplitude modulator are configured and arranged to direct light onto the detector unit.

8. The light processor of claim 1, further comprising a collocation device operatively disposed intermediate the first light amplitude modulator and the detector unit, and operatively disposed intermediate the second light amplitude modulator and the detector unit, the collocation device being configured and arranged to direct both light in the reference path and the sample path onto the detector unit.

9. The light processor of claim 8, wherein the collocation device comprises a prism.

10. The light processor of claim 1, wherein the at least one of the first light amplitude modulator and the second light amplitude modulator is a MEMS-based diffraction grating modulator.

11. The light processor of claim 1, further comprising a focusing device operatively disposed intermediate the splitter and at least one of the first light amplitude modulator and the second light amplitude modulator, and arranged to focus light onto the at least one of the first light amplitude modulator and the second light amplitude modulator.

12. The light processor of claim 11, wherein the focusing device comprises a first focusing element operatively disposed intermediate the splitter and the first light amplitude modulator and adapted to focus light in the sample pathway onto the first light amplitude modulator, and a second focusing element operatively disposed intermediate the splitter and the second light amplitude modulator and adapted to focus light in the reference pathway onto the second light amplitude modulator.

13. The light processor of claim 1, further comprising a processor, wherein the processor is adapted to actuate the first light amplitude modulator and the second light amplitude modulator to alternately transmit light, such that light in the reference pathway and light in the sample pathway are alternately projected onto the detector unit.

14. The light processor of claim 1, wherein the detector unit comprises a first detector arranged to receive light from the sample pathway and a second detector adapted to receive light from the reference pathway.

15. The light processor of claim 14, wherein the light source is adapted to produce light having a plurality of wavelengths, and wherein light in each of the reference pathway and the sample pathway comprises a plurality of wavelengths, and wherein at least one of the first detector and the second detector is comprised of an array detector comprising a plurality of array elements, each array element being arranged to detect a corresponding at least one of the plurality of wavelengths from both the reference pathway and the sample pathway.

16. The light processor of claim 14, wherein at least one of the first detector and the second detector consists of a single detector element.

17. The light processor of claim 1, wherein the detector unit comprises a detector arranged to receive light from both the reference pathway and the sample pathway.

18. The light processor of claim 17, further comprising a collocation device operatively disposed intermediate the first light amplitude modulator and the detector unit and operatively disposed intermediate the second light amplitude modulator and the detector unit, the collocation device being configured and arranged to direct both light in the reference pathway and light in the sample pathway onto the detector.

19. The light processor of claim 18, wherein the detector comprises an array detector.

20. The light processor of claim 18, wherein the detector consists of a single detector element.

21. The light processor of claim 20, wherein the light source produces light comprising a plurality of wavelengths, and the detector element is arranged to receive the plurality of wavelengths from both of the sample pathway and the reference pathway.

22. The light processor of claim 1, wherein the light source is adapted to sequentially project light comprising a first wavelength and light comprising a second wavelength, the first wavelength being different than the second wavelength.

23. The light processor of claim 1, wherein the light source comprises a tunable source.

24. The light processor of claim 1, wherein the splitter comprises a conventional beam splitter.

25. The light processor of claim 1, wherein the splitter comprises a fiber optic configured and arranged to tap a portion of one of the sample pathway and the reference pathway to form the other of the sample pathway and the reference pathway.

26. The light processor of claim 1, further comprising an optical switching device configured and arranged to alternately project light in the reference pathway and light in the sample pathway onto the detector unit.

27. The light processor of claim 26, wherein the optical switching device is a switching mirror.

28. The light processor of claim 1, further comprising a processor operatively coupled to the detector unit and adapted to determine a first amount of light comprising the sample pathway and a second amount of light comprising the reference pathway.

29. The light processor of claim 1, further comprising an integrator device having an input to receive light from the first light amplitude modulator and an output optically coupled to the detector unit.

30. The light processor of claim 29, wherein the integrator device comprises an integrating sphere.

31. A light processor comprising:
a light source adapted to produce light having at least one wavelength;
a splitter adapted to form a reference pathway and a sample pathway with the light, the sample pathway adapted to receive a sample;
a first light amplitude modulator optically coupled to the splitter and disposed in one of the reference pathway and the sample pathway;
a detector unit optically coupled to the first light amplitude modulator, and adapted to receive light from the sample pathway and light from the reference pathway; and
a wavelength selective device operatively disposed intermediate the light source and the first light amplitude modulator, and adapted to divide light in the reference pathway and light in the sample pathway into a plurality of component wavelengths;
wherein the wavelength selective device comprises a first wavelength selective element configured and arranged to divide both light in the sample pathway and light in the reference pathway.

32. The light processor of claim 31, wherein the light source is adapted to produce light comprising a plurality of wavelengths, and wherein the first light amplitude modulator is configured and arranged to separately amplitude modulate at least light at a first of the plurality of wavelengths and light at a second of the plurality of wavelengths.

33. The light processor of claim 31, further comprising a second light amplitude modulator optically coupled to the splitter and disposed in the other of the reference pathway and sample pathway.

34. The light processor of claim 33, wherein at least one of the first light amplitude modulator and the second light amplitude modulator is a liquid crystal modulator.

35. The light processor of claim 31, further comprising a second light amplitude modulator optically coupled to the splitter and disposed in the other of the reference pathway and sample pathway, and wherein at least one of the first light amplitude modulator and the second light amplitude modulator comprises a plurality of addressable regions, each of the plurality of addressable regions being configured and arranged to modulate a corresponding one of the plurality of component wavelengths.

36. The light processor of claim 35, wherein the first light amplitude modulator and the second light amplitude modulator are disposed on a common chip.

37. The light processor of claim 35, further comprising a processor adapted to actuate at least the first light amplitude modulator to selectively transmit the component wavelengths such that one of an ND-type or spectrometer-type output is obtained from the detector unit.

38. The light processor of claim 31, further comprising an integrator device operatively disposed intermediate the wavelength selective device and the detector unit, wherein the integrator device is comprised of a dispersive element configured and arranged to recombine the component wavelengths of at least one of the reference pathway and the sample pathway.

39. A light processor comprising:
a light source adapted to produce light having at least one wavelength;
a splitter adapted to form a reference pathway and a sample pathway with the light, the sample pathway adapted to receive a sample;
a first light amplitude modulator optically coupled to the splitter and disposed in one of the reference pathway and the sample pathway; and
a detector unit optically coupled to the first light amplitude modulator, and adapted to receive light from the sample pathway and light from the reference pathway;
wherein the detector unit comprises a first detector arranged to receive light from the sample pathway and a second detector adapted to receive light from the reference pathway; and
wherein the detector unit is adapted to combine an output of the first detector and an output of the second detector in an alternating manner to form a signal having an AC component.

40. A light processor comprising:
a light source adapted to produce light having at least one wavelength;

a splitter adapted to form a reference pathway and a sample pathway with the light, the sample pathway adapted to receive a sample;

a first light amplitude modulator optically coupled to the splitter and disposed in one of the reference pathway and the sample pathway;

a detector unit optically coupled to the first light amplitude modulator, and adapted to receive light from the sample pathway and light from the reference pathway; and a processor operatively coupled to the detector unit and adapted to determine a first amount of light comprising the sample pathway and a second amount of light comprising the reference pathway;

wherein the processor is operatively coupled to the first light amplitude modulator, and adapted to actuate the first modulator in response to at least one of the first amount of light and the second amount of light.

41. The light processor of claim 40, wherein the first amount of light and the second amount of light both consist of a same single wavelength.

42. The light processor of claim 40, wherein the processor is adapted to actuate the first light modulator to equalize the first amount of light with the second amount of light.

43. A spectrometer, comprising:
a light source adapted to produce light having a plurality of wavelengths;

a splitter adapted to form a reference pathway and a sample pathway with light from the light source, the sample pathway adapted to receive a sample;

a wavelength selective device coupled to the light source and adapted such that light in the reference pathway and light in the sample pathway is divided into a plurality of component wavelengths;

a first light amplitude modulator disposed in the reference pathway and optically coupled to the wavelength selective device, and configured and arranged to separately modulate light at a first wavelength of the plurality of component wavelengths and light at a second wavelength of the plurality of component wavelengths;

a second light amplitude modulator disposed in the sample pathway and optically coupled to the wavelength selective device, and configured and arranged to separately modulate light at the first wavelength of the plurality of component wavelengths and light at the second wavelength of the plurality of component wavelengths; and an integrator device optically coupled to receive the component wavelengths from the first light amplitude modulator and the second light amplitude modulator.

44. The spectrometer of claim 43, wherein the splitter is disposed intermediate the light source and the wavelength selective device.

45. The spectrometer of claim 43, wherein the light source comprises a broadband source.

46. The spectrometer of claim 45, wherein the light source comprises a plurality of narrowband sources.

47. The spectrometer of claim 43, wherein the wavelength selective device comprises a dispersive device configured and arranged to divide light in at least one of the reference pathway and the sample pathway into component wavelengths.

48. The spectrometer of claim 43, wherein the wavelength selective device comprises a first dispersive element configured and arranged to separate both light in the reference pathway into component wavelengths and light in the sample pathway into component wavelengths.

49. The spectrometer of claim 47, wherein the dispersive element comprises a diffraction grating.

50. The spectrometer of claim 43, wherein the integrator device is configured and arranged to recombine a plurality of component wavelengths of at least one of the reference pathway and the sample pathway.

51. The spectrometer of claim 47, wherein the integrator device is comprised of a dispersive element configured and arranged to recombine the component wavelengths light of the at least one of the reference pathway and the sample pathway.

52. The spectrometer of claim 43, wherein the integrator device is comprised of a first integrator element configured and arranged to recombine component wavelengths of light in the reference pathway and a second integrator element configured and arranged to recombine component wavelengths of light in the sample pathway.

53. The spectrometer of claim 52, wherein at least one of the first integrator element and the second integrator element comprises a diffraction grating.

54. The spectrometer of claim 43, wherein the integrator device is comprised of an integrating sphere.

55. The spectrometer of claim 54, wherein the integrator device is comprised of a first integrating sphere configured and arranged to recombine component wavelengths of light in the reference pathway and a second integrating sphere configured and arranged to recombine component wavelengths of light in the sample pathway.

56. The spectrometer of claim 43, wherein at least the second light amplitude modulator comprises a plurality of addressable regions, each of the plurality of addressable regions being configured and arranged to modulate a corresponding at least one of the plurality of component wavelengths.

57. The spectrometer of claim 56, wherein the at least one of the first light amplitude modulator and the second light amplitude modulator is a diffraction grating modulator.

58. The spectrometer of claim 57, wherein the at least one of the first light amplitude modulator and the second light amplitude modulator is a MEMS-based diffraction grating modulator.

59. The spectrometer of claim 56, wherein the at least one of the first light amplitude modulator and the second light amplitude modulator is a liquid crystal modulator.

60. The spectrometer of claim 43, wherein the first light amplitude modulator and the second light amplitude modulator are disposed on a common chip.

61. The spectrometer of claim 43, further comprising a detector unit optically coupled to an output of the integrator and comprising at least one detector.

62. The spectrometer of claim 61, wherein the first light amplitude modulator and the second light amplitude modulator are adapted to alternately transmit light, such that light in the reference pathway and light in the sample pathway are alternately transmitted to the detector unit.

63. The spectrometer of claim 61, wherein the detector unit comprises a first detector arranged to receive light from the sample pathway and a second detector adapted to receive light from the reference pathway.

64. The spectrometer of claim 63, wherein at least one of the first detector and the second detector is comprised of an array of detector elements.

65. The spectrometer of claim 63, wherein at least one of the first detector and the second detector consists of single detector element.

66. The spectrometer of claim 63, wherein the detector unit is adapted to combine an output of the first detector and an output of the second detector in an alternate manner to form a signal having an AC component.

67. The spectrometer of claim 61, wherein the detector unit comprises a detector arranged to receive light from both the reference pathway and the sample pathway.

68. The spectrometer of claim 67, wherein the detector comprises an array of detector elements, each detector element adapted to detect a corresponding at least one wavelength of the wavelengths comprising each of the reference pathway and the sample pathway.

69. The spectrometer of claim 68, wherein the detector unit is capable of summing outputs of the detector elements.

70. The spectrometer of claim 67, wherein the detector consists of single detector element.

71. The spectrometer of claim 70, wherein the detector element is arranged to receive the component wavelengths from both the sample pathway and the reference pathway.

72. The spectrometer of claim 67, further comprising a collocation device operatively disposed intermediate the integrator device and the detector unit, the collocation device being configured and arranged to direct both light in the reference path and the sample path onto the detector.

73. The spectrometer of claim 56, further comprising a processor adapted to actuate each of the plurality of addressable regions of at least the second light amplitude modulator to apply a corresponding weight to each of the plurality of component wavelengths, the weights corresponding to a transfer function of a chemical constituent, whereby the output of the integrator corresponds to a concentration of the chemical constituent.

74. The spectrometer of claim 73, wherein the processor is adapted to actuate each of the plurality of addressable regions of the second light amplitude modulator to sequentially apply weights corresponding to a transfer function of a first chemical constituent and weights corresponding to a transfer function of a second chemical constituent, whereby the output of the integrator sequentially corresponds to a concentration of the first chemical constituent and the second chemical constituent.

75. The spectrometer of claim 73, wherein at least one of weights is substantially equal to zero, whereby the addressable region applying the at least one weight has a throughput of substantially zero.

76. The spectrometer of claim 43, further comprising a processor adapted to actuate at least the second amplitude light modulator so as to sequentially transmit light consisting of a first set of wavelengths and light consisting of a second set of wavelengths, at least one wavelength of the second set of wavelengths being different than the wavelengths comprising the second set of wavelengths.

77. The spectrometer of claim 61, further comprising a processor operatively coupled to the detector unit and adapted to determine a first amount of light comprising the sample pathway and a second amount of light comprising the reference pathway.

78. The spectrometer of claim 77, wherein the first amount of light and the second amount of light consist of a same, single wavelength.

79. The spectrometer of claim 77, wherein the processor is operatively coupled to at least one of the first light amplitude modulator and the second light amplitude modulator, and is adapted to actuate the at least one of the first modulator and second modulator in response to at least one of the first amount of light and the second amount of light.

80. The spectrometer of claim 79, wherein the processor is adapted to actuate the at least one of the first modulator and the second modulator to equalize the first amount of light with the second amount of light.

81. The spectrometer of claim 43, wherein the wavelength selective device comprises at least a first dispersive element configured and arranged to separate light in the reference pathway and light in the sample pathway into component wavelengths, and wherein at least one of the first light amplitude modulator and the second light modulator is adapted to retro-reflect light in a corresponding pathway back onto the dispersive element, whereby the integrator comprises a portion of the dispersive element.

82. A spectrometer, comprising:
a light source adapted to produce light having a plurality of wavelengths in a sample pathway;
a wavelength selective device coupled to the light source and adapted to divide light in the sample pathway into a plurality of component wavelengths;
a first light amplitude modulator disposed in the sample pathway and optically coupled to the wavelength selective device, the first light amplitude modulator comprising a plurality of addressable regions, each of the plurality of addressable regions being configured and arranged to modulate a corresponding at least one of the plurality of component wavelengths;
a processor adapted to actuate each of the plurality of addressable regions to apply a corresponding weight to each of the plurality of wavelengths, the weights corresponding to a transfer function of a chemical constituent;
an integrator device optically coupled to receive the component wavelengths from the first light amplitude modulator; and
a splitter adapted to form a reference pathway with light from the light source.

83. The spectrometer of claim 82, further comprising a second light amplitude modulator disposed in the reference pathway and optically coupled to the wavelength selective device, the second light amplitude modulator comprising a plurality of addressable regions, each of the plurality of addressable regions being configured and arranged to modulate a corresponding at least one of the plurality of component wavelengths.

84. The spectrometer of claim 82, wherein the light source comprises a broadband source.

85. The spectrometer of claim 84, wherein the light source comprises a plurality of narrowband sources.

86. The spectrometer of claim 82, wherein the wavelength selective device comprises a dispersive device configured and arranged to divide light in the sample pathway into component wavelengths.

87. The spectrometer of claim 86, wherein the dispersive device comprises a diffraction grating.

88. The spectrometer of claim 82, wherein the wavelength selective device comprises a dispersive element configured and arranged to separate light in the sample pathway and the reference pathway into component wavelengths.

89. The spectrometer of claim 82, wherein the integrator device is configured and arranged to recombine a plurality of component wavelengths in the sample pathway.

90. The spectrometer of claim 82, wherein the wavelength selective device comprises a dispersive device configured and arranged to divide light in the sample pathway into component wavelengths, and wherein the integrator is comprised of a dispersive element configured and arranged to recombine the component wavelengths light of the sample pathway.

91. The spectrometer of claim 82, wherein the integrator device is comprised of a first integrator element configured and arranged to recombine component wavelengths of light in the reference pathway and a second integrator element configured and arranged to recombine component wavelengths of light in the sample pathway.

92. The spectrometer of claim 91, wherein at least one of the first integrator element and the second integrator element comprises a diffraction grating.

93. The spectrometer of claim 82, wherein the integrator device is comprised of an integrating sphere.

94. The spectrometer of claim 82, wherein the integrator device is comprised of a first integrating sphere configured and arranged to recombine component wavelengths of light in the sample pathway and a second integrating sphere configured and arranged to recombine component wavelengths of light in the reference pathway.

95. The spectrometer of claim 82, wherein the first light amplitude modulator is a diffraction grating modulator.

96. The spectrometer of claim 95, wherein the first light amplitude modulator is a MEMS-based diffraction grating modulator.

97. The spectrometer of claim 94, wherein the first light amplitude modulator is a liquid crystal modulator.

98. The spectrometer of claim 83, wherein the first light amplitude modulator and the second light amplitude modulator are disposed on common chip.

99. The spectrometer of claim 82, further comprising a detector unit optically coupled to an output of the integrator device.

100. The spectrometer of claim 82, further comprising a processor adapted to actuate the first amplitude light modulator so as to sequentially transmit light consisting of a first set of wavelengths and light consisting of a second set of wavelengths, the second set of wavelengths being different than the second set of wavelengths.

101. The spectrometer of claim 82, further comprising a detector unit optically coupled to an output of the integrator, and further comprising a processor operatively coupled to the detector unit and adapted to determine a first amount of light comprising the reference pathway and a second amount of light comprising the sample pathway.

102. The spectrometer of claim 101, wherein the first amount of light and the second amount of light both correspond to light consisting of a single wavelength.

103. The spectrometer of claim 102, wherein the processor is operatively coupled to the first light amplitude modulator and the second light modulator, and adapted to actuate at least one of the first modulator and the second light modulator in response to the first amount of light and the second amount of light.

104. The spectrometer of claim 103, wherein the processor is adapted to actuate at least one of the first light modulator and the second light modulator to equalize the first amount of light with the second amount of light.

105. The spectrometer of claim 82, wherein the wavelength selective device comprises a dispersive element configured and arranged to separate light in the sample pathway into component wavelengths, and wherein the first light amplitude modulator is adapted to retro-reflect light in the sample pathway back onto the dispersive element, whereby the integrator comprises a portion of the dispersive element.

106. A spectrometer comprising:
a light source adapted to produce light having a plurality of wavelengths in a sample pathway;
a wavelength selective device coupled to the light source and adapted to divide light in the sample pathway into a plurality of component wavelengths;
a first light amplitude modulator disposed in the sample pathway and optically coupled to the wavelength selective device, the first light amplitude modulator comprising a plurality of addressable regions, each of the plurality of addressable regions being configured and arranged to modulate a corresponding at least one of the plurality of component wavelengths;
a processor adapted to actuate each of the plurality of addressable regions to apply a corresponding weight to each of the plurality of wavelengths, the weights corresponding to a transfer function of a chemical constituent; and
an integrator device optically coupled to receive the component wavelengths from the first light amplitude modulator;
wherein an output of the integrator corresponds to a concentration of the chemical constituent.

107. A method of processing light, comprising the steps of:
projecting light having at least one wavelength;
splitting the light to form a portion of light in a reference pathway and a portion of light in a sample pathway;
projecting the portion of light in the sample pathway through a sample;
a first step of amplitude modulating the portion of the light in at least one of the reference pathway and the sample pathway;
a second step of amplitude modulating a portion of the light in the other of the reference pathway and the sample pathway; and
detecting the portion of the light in the sample pathway and the portion of the light in the reference pathway after the first step of amplitude modulating;
wherein at least one of the first step of amplitude modulating and the second step of amplitude modulating the light includes diffracting light.

108. The method of processing light of claim 107, wherein the step of projecting light includes projecting light having a plurality of wavelengths.

109. The method of processing light of claim 108, wherein the step of projecting light includes projecting light from a plurality of narrowband sources, each narrowband source having a different wavelength.

110. The method of processing light of claim 108, further comprising a step of dividing at least the portion of light in the sample pathway into a plurality of component wavelengths, the step of dividing occurring after the step of projecting and before the first step of amplitude modulating.

111. The method of processing light of claim 110, wherein the first step of amplitude modulating comprises separately amplitude modulating light at a first component wavelength and amplitude modulating light at a second component wavelength, in parallel.

112. The method of processing light of claim 110, further comprises a step of dividing the portion of light in the reference pathway into component wavelengths.

113. The method of processing light of claim 110, wherein the step of dividing the light comprises diffracting the light.

114. The method of processing light of claim 107, further comprising a step of focusing light in the sample pathway prior to the first step of amplitude modulating and a step of focusing light in the reference pathway prior to the second step of amplitude modulating.

115. The method of processing light of claim 107, further comprising a step of alternately transmitting the portion of light in the reference pathway and the portion of light in the sample pathway, whereby light in the reference pathway and light in the sample pathway are alternately detected during the step of detecting.

116. The method of processing light of claim 107, wherein the step of detecting includes detecting light from both the reference pathway and light from the sample pathway with a same detector.

117. The method of processing light of claim 107, wherein the step of projecting light comprises a plurality of sequential steps of projecting light of different wavelengths.

118. The method of processing light of claim 107, wherein the step of projecting light comprises tuning a light source.

119. The method of processing light of claim 107, further comprising a step of determining an amount of light in the sample pathway and a step of determining an amount of light in the reference pathway.

120. The method of processing light of claim 119, wherein the step of determining the amount of light in the sample pathway and the step of determining the amount of light in the reference pathway comprises determining an amount of light of a same wavelength in both of the reference pathway and the sample pathway.

121. The method of processing light of claim 107, further comprising a step of integrating the light after the first step of amplitude modulating and before the step of detecting.

122. The method of processing light of claim 113, further comprising a step of integrating the light after the first step of amplitude modulating and before the step of detecting, wherein the step of integrating includes diffractively recombining the portion of light in at least one of the reference pathway and the sample pathway.

123. A method of processing light comprising: the steps of:
projecting light having at least one wavelength:
splitting the light to form a portion of light in a reference pathway and a portion of light in a sample pathway;
projecting the portion of light in the sample pathway through a sample;
a first step of amplitude modulating the portion of the light in at least one of the reference pathway and the sample pathway;
detecting the portion of the light in the sample pathway and the portion of the light in the reference pathway after the first step of amplitude modulating; and
determining an amount of light in the sample pathway and a step of determining an amount of light in the reference pathway;
wherein the step of determining the amount of light in the sample pathway and the step of determining the amount of light in the reference pathway comprises determining an amount of light of a same wavelength in both of the reference pathway and the sample pathway; and
wherein at least the first step of amplitude modulating is at least partially dependent on an amount of light measured in at least one of the step of determining the amount of light in the sample pathway and the step of determining the amount of light in the reference pathway.

124. The method of processing light of claim 123, wherein the step of determining the amount of light in the sample pathway and the step of determining the amount of light in the reference pathway comprises determining an amount of light of consisting of a same wavelength in both of the reference pathway and the sample pathway.

125. The method of processing light of claim 123, wherein at least the first step of amplitude modulating results in equalizing the amount of light in the reference pathway and the amount of light in the sample pathway.

126. A method of processing light, comprising:
projecting light having a plurality of wavelengths;
splitting the light to form a portion of light in a reference pathway and a portion of light in a sample pathway;
projecting the portion of the light in the sample pathway through a sample;
dividing the portion of the light in the sample pathway into a plurality of component wavelengths;
dividing the portion of the light in the reference pathway into a plurality of component wavelengths;
separately amplitude modulating at least two component wavelengths in the sample pathway;
separately amplitude modulating at least two component wavelengths in the reference pathway;
integrating light in the sample pathway after the step of amplitude modulating light in the sample pathway; and
integrating light in the reference pathway after the steps of amplitude modulating light in the reference pathway.

127. The method of processing light of claim 126, wherein the step of projecting light comprises projecting light having a plurality of wavelengths.

128. The method of processing light of claim 127, wherein the step of projecting light comprises projecting light from a plurality of narrowband sources, each narrowband source having a different wavelength.

129. The method of processing light of claim 126, wherein at least one of the step of dividing the portion of the light in the reference pathway and the step of dividing the portion of the light in the sample pathway includes dispersing light.

130. The method of processing light of claim 129, wherein at least one of the step of dividing the portion of the light in the reference pathway and the step of dividing the portion of the light in the sample pathway includes diffracting light.

131. The method of processing light of claim 126, wherein the step of integrating comprises diffractively recombining the component wavelengths of light in the sample pathway.

132. The method of processing light of claim 126, wherein at least the second step of amplitude modulating comprises spatially modulating a plurality of component wavelengths in parallel.

133. The method of processing light of claim 126, wherein at least one of the first amplitude modulating step and the second amplitude modulating step includes diffracting light.

134. The method of processing light of claim 126, further comprising a step of detecting light in at least one of the sample pathway and the reference pathway.

135. The method of processing light of claim 134, further comprising a step of alternately transmitting the portion of the light in the reference pathway and the portion of the light in the sample pathway after the step of separately modulating light in the sample pathway and the step of separately modulating light in the reference pathway, whereby the portion of light in the reference pathway and the portion of light in the sample pathway are alternately detected during the step of detecting.

136. The method of processing light of claim 126, wherein the step of amplitude modulating light in the sample pathway comprises applying a corresponding weight to each of the plurality of component wavelengths, the weights corresponding to a transfer function of a chemical constituent.

137. The method of processing light of claim 136, wherein the step of amplitude modulating comprises blocking at least one of the plurality of wavelengths, whereby the weight applied to the at least one of the plurality of wavelengths is substantially equal to zero.

138. The method of processing light of claim 126, wherein the step of separately amplitude modulating light in the sample pathway comprises sequentially transmitting light consisting of a first set of one or more wavelengths and light consisting of a second set of one or more wavelengths, the second set of wavelengths being different than the second set of wavelengths.

139. The method of processing light of claim 126, further comprising a step of determining an amount of light in the reference pathway and a step of determining an amount of light in the sample pathway.

140. The method of processing light of claim 139, wherein both the step of determining the amount of light in the reference pathway and the step of determining the amount of light in the sample pathway comprises determining an amount of light consisting of a same wavelength in both the sample pathway and the reference pathway.

141. The method of processing light of claim 139, wherein at least one of the step of amplitude modulating component wavelengths in the sample pathway and the step of amplitude modulating component wavelengths in the reference pathway is at least partially dependent on at least one of the amount of light measured in the step of determining the amount of light in the sample pathway and the amount of light measured in the step of determining the amount of light in the reference pathway.

142. The method of processing light of claim 141, wherein at least one of the step of amplitude modulating component wavelengths in the sample pathway and the step of amplitude modulating component wavelengths in the reference pathway includes equalizing the amount of light in sample pathway with the amount of light in the reference pathway.

143. A method of processing light, comprising steps of:
producing light having a plurality of wavelengths in a sample pathway;
dividing the light in the sample pathway into a plurality of component wavelengths;
separately amplitude modulating at least two of the plurality of wavelengths to apply a corresponding weight to each of the at least two of the plurality of component wavelengths in the sample pathway, the weights corresponding to a transfer function of a chemical constituent;
splitting the light to form a reference pathway prior to the step of separately amplitude modulating; and
integrating the at least two of the plurality of wavelengths after the step of separately amplitude modulating.

144. The method of processing light of claim 143, further comprising a second step of separately modulating the at least two of the plurality of wavelengths to apply a corresponding weight to each of the at least two of the plurality of wavelengths in the reference pathway, the weights corresponding to the transfer function of the chemical constituent.

145. The method of processing light of claim 143, wherein the step of dividing comprises a step of diffracting the light.

146. The method of processing light of claim 143, further comprising a step of determining a first amount of light in the reference pathway and a step of determining a second amount of light the sample pathway.

147. The method of processing light of claim 146, wherein the first amount of light and the second amount of light both correspond to light consisting a same set of one or more wavelengths of light.

148. The method of processing light of claim 146, wherein the step of separately amplitude modulating is performed in response to at least one of the first amount of light and the second amount of light.

149. The method of processing light of claim 148, wherein the step of separately amplitude modulating is performed to equalize the first amount of light and the second amount of light.

150. A method of processing light comprising steps of:
producing light having a plurality of wavelengths in a sample pathway;
dividing the light in the sample pathway into a plurality of component wavelengths;
separately amplitude modulating at least two of the plurality of wavelengths to apply a corresponding weight to each of the at least two of the plurality of component wavelengths in the sample pathway, the weights corresponding to a transfer function of a chemical constituent; and
integrating the at least two of the plurality of wavelengths after the step of separately amplitude modulating;
wherein the step of integrating results in an output corresponding to a concentration of the chemical constituent.

* * * * *